(12) United States Patent
Lavoie et al.

(10) Patent No.: US 10,834,159 B2
(45) Date of Patent: *Nov. 10, 2020

(54) STANDARDIZED HOT-PLUGGABLE TRANSCEIVING UNIT PROVIDING A CLOUD GATEWAY FUNCTIONALITY

(71) Applicant: RIEDEL COMMUNICATIONS CANADA INC, Laval (CA)

(72) Inventors: Renaud Lavoie, Laval (CA); Sebastien Berthiaume, St-Eustache (CA)

(73) Assignee: RIEDEL COMMUNICATIONS CANADA INC., Laval (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/720,114

(22) Filed: Dec. 19, 2019

(65) Prior Publication Data

US 2020/0128059 A1 Apr. 23, 2020

Related U.S. Application Data

(63) Continuation of application No. 15/816,577, filed on Nov. 17, 2017, now Pat. No. 10,560,507.

(51) Int. Cl.
*G06F 13/00* (2006.01)
*H04L 29/06* (2006.01)
(Continued)

(52) U.S. Cl.
CPC ........ *H04L 65/601* (2013.01); *G06F 13/4081* (2013.01); *G06F 13/4282* (2013.01);
(Continued)

(58) Field of Classification Search
CPC ....... H04L 65/601; H04L 67/02; H04L 67/42; H04L 65/1069; H04L 65/602; G06F 13/4081; G06F 13/4282
(Continued)

(56) References Cited

U.S. PATENT DOCUMENTS 8,078,744 B2 * 12/2011 Kim ................... H04N 21/2381
709/230
9,270,723 B2 * 2/2016 Kim ................... H04N 21/2381
(Continued)

OTHER PUBLICATIONS

Sullivan, Dan,Cloud Computing:Cloud acceleration, TechNet Magzine, May 4, 2017.
(Continued)

*Primary Examiner* — Kenneth R Coulter
(74) *Attorney, Agent, or Firm* — IP Delta Plus Inc.

(57) ABSTRACT

Standardized hot-pluggable transceiving unit implementing a cloud gateway functionality. The transceiving unit receives a source video IP flow. At least one processing unit in the housing executes a HTTP client and a conversion function. The HTTP client establishes a connection with a HTTP server hosted by a cloud video server, and receives the source video IP flow from the HTTP server of the cloud video server via the first connector. The source video IP flow uses one of the HTTP or the HTTPS protocol. The conversion function generates a video stream based on the source video IP flow, and the video stream is outputted by the transceiving unit. Alternatively, the transceiving unit receives a source video stream converted in a video IP flow by the conversion function, and the HTTP client uploads the video IP flow to the HTTP server of the cloud video server.

24 Claims, 23 Drawing Sheets

(51) Int. Cl.
    *G06F 13/40*     (2006.01)
    *G06F 13/42*     (2006.01)
    *H04L 29/08*     (2006.01)

(52) U.S. Cl.
    CPC ........ *H04L 65/1069* (2013.01); *H04L 65/602* (2013.01); *H04L 67/02* (2013.01); *H04L 67/42* (2013.01)

(58) Field of Classification Search
    USPC .......................... 709/203, 227–229, 231, 232
    See application file for complete search history.

(56) References Cited

U.S. PATENT DOCUMENTS

| | | | | |
|---|---|---|---|---|
| 9,860,603 | B2* | 1/2018 | Yang | H04N 21/4126 |
| 10,560,507 | B2* | 2/2020 | Lavoie | H04L 65/602 |
| 2008/0256254 | A1* | 10/2008 | Kim | H04N 21/2381 |
| | | | | 709/231 |
| 2012/0102157 | A1* | 4/2012 | Kim | H04N 21/2381 |
| | | | | 709/219 |
| 2015/0304459 | A1* | 10/2015 | Pakula | H04L 67/02 |
| | | | | 709/203 |
| 2016/0286279 | A1* | 9/2016 | Yang | H04N 21/4126 |

OTHER PUBLICATIONS

Jacober, Lorenz, Akamai Cloud Networking Update—Transform the enterprise network to accelerate applications, maintain security, lower costs and connect to clouds, Akamai Community, Nov. 10, 2015.

* cited by examiner

STANDARDIZED HOT-PLUGGABLE TRANSCEIVING UNIT PROVIDING A CLOUD GATEWAY FUNCTIONALITY

TECHNICAL FIELD

The present disclosure relates to the field of standardized hot-pluggable transceiving units. More specifically, the present disclosure relates to a standardized hot-pluggable transceiving units providing a cloud gateway functionality.

BACKGROUND

Small Form-factor Pluggable (SFP) units represent one example of standardized hot-pluggable transceiving units. SFP units are standardized units adapted to be inserted within a chassis. A suite of specifications, produced by the SFF (Small Form Factor) Committee, describe the size of the SFP unit, so as to ensure that all SFP compliant units may be inserted smoothly within one same chassis, i.e. inside cages, ganged cages, superposed cages and belly-to-belly cages. Specifications for SFP units are available at the SFF Committee website.

SFP units may be used with various types of exterior connectors, such as coaxial connectors, optical connectors, RJ45 connectors and various other types of electrical connectors. In general, an SFP unit allows connection between an external apparatus, via a front connector of one of the aforementioned types, and internal components of a hosting unit, for example a motherboard, a card or a backplane leading to further components, via a back interface of the SFP unit. Specification no INF-8074i Rev 1.0, entitled "SFP (Small Form-factor Pluggable) Transceiver, dated May 12, 2001, generally describes sizes, mechanical interfaces, electrical interfaces and identification of SFP units.

The SFF Committee also produced specification no SFF-8431 Rev. 4.1, "Enhanced Small Form-factor Pluggable Module SFP+", dated Jul. 6, 2010. This document, which reflects an evolution of the INF-8074i specification, defines, inter alia, high speed electrical interface specifications for 10 Gigabit per second SFP+ modules and hosts, and testing procedures. The term "SFP+" designates an evolution of SFP specifications.

INF-8074i and SFF-8431 do not generally address internal features and functions of SFP devices. In terms of internal features, they simply define identification information to describe SFP devices' capabilities, supported interfaces, manufacturer, and the like. As a result, conventional SFP devices merely provide connection means between external apparatuses and components of a hosting unit, the hosting unit in turn exchanging signals with external apparatuses via SFP devices.

Recently, SFP units with internal features and functions providing signal processing capabilities have appeared. For instance, some SFP units now include signal re-clocking, signal reshaping or reconditioning, signals combination or separation, signal monitoring, etc.

In the field of video transport, advances have been made recently for transporting the payload of a video signal into Internet Protocol (IP) packets (e.g. Serial Digital Interface (SDI) video payloads encapsulated into IP packets). Furthermore, an SFP unit can be adapted to receive the IP flows transporting the video payloads, and to process the video payloads.

Another trend in the Information Technology (IT) industry is the usage of cloud servers in a cloud infrastructure for storing a variety of data. The data are made available to multiple users over an IP networking infrastructure. The cloud servers implement a Hypertext Transfer Protocol (HTTP) server, and the data hosted by the cloud server can be accessed through a HTTP client.

Cloud servers are therefore a practical solution for storing video data generated in the context of various industries (e.g. the film industry, the video based security industry, the television broadcasting industry, etc.), and making them available to multiple users over the IP networking infrastructure. IP flows using the HTTP (or Hypertext Transfer Protocol Secure (HTTPS)) protocol transport video payloads from the cloud video servers to video receivers (such as real-time video systems processing the received video payloads in real-time). Examples of video receivers include professional broadcasting equipment, visualization equipment, video post-processing equipment, etc. However, some video receivers are not adapted for receiving IP flows transporting video payloads over the HTTP or HTTPs protocols.

Therefore, there is a need for a new standardized hot-pluggable transceiving unit providing a cloud gateway functionality between the cloud video servers and the video receivers (e.g. real-time video systems).

SUMMARY

According to a first aspect, the present disclosure provides a standardized hot-pluggable transceiving unit. The transceiving unit comprises a housing having specific standardized dimensions and adapted to being inserted into a chassis of a hosting unit. The transceiving unit comprises a first connector for receiving a source video Internet Protocol (IP) flow. The transceiving unit comprises at least one processing unit in the housing for executing a Hypertext Transfer Protocol (HTTP) client and a conversion function. The HTTP client establishes a connection with a HTTP server hosted by a cloud video server and receives the source video IP flow from the HTTP server of the cloud video server via the first connector. The source video IP flow uses one of the HTTP or the Hypertext Transfer Protocol Secure (HTTPS) protocol. The conversion function generates a video stream based on the source video IP flow. The transceiving unit comprises a second connector for outputting the video stream.

According to a second aspect, the present disclosure provides a system comprising a chassis adapted for receiving at least one standardized hot-pluggable transceiving unit. The chassis comprises at least one processing unit capable of processing packets of an IP flow. The system further comprises the aforementioned standardized hot-pluggable transceiving unit inserted into the chassis. The transceiving unit comprises a host interface on a back panel of its housing for exchanging data with the processing unit of the chassis.

According to a third aspect, the present disclosure provides a standardized hot-pluggable transceiving unit. The transceiving unit comprises a housing having specific standardized dimensions and adapted to being inserted into a chassis of a hosting unit. The transceiving unit comprises a connector for receiving a source video stream. The transceiving unit comprises at least one processing unit in the housing for executing a conversion function and a HTTP client. The conversion function generates a video IP flow based on the source video stream. The HTTP client establishes a connection with a HTTP server hosted by a cloud video server and transmits the video IP flow to the HTTP server of the cloud video server via one of the following: the connector or another connector of the transceiving unit. The video IP flow uses one of the HTTP or the HTTPS protocol.

BRIEF DESCRIPTION OF THE DRAWINGS

Embodiments of the disclosure will be described by way of example only with reference to the accompanying drawings, in which.

DETAILED DESCRIPTION

Figure 1:
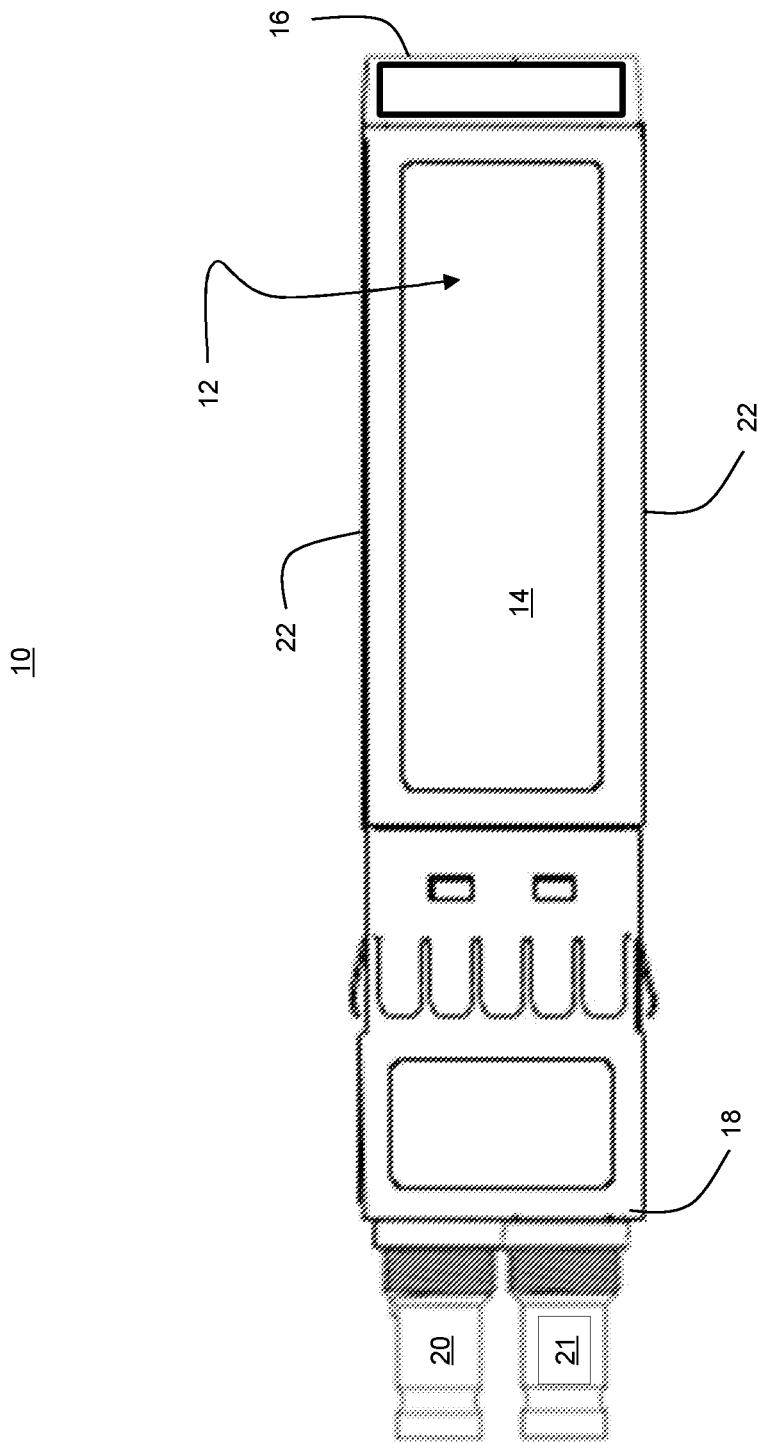
FIG. 1 is a top view of an SFP unit.
Figure 2:
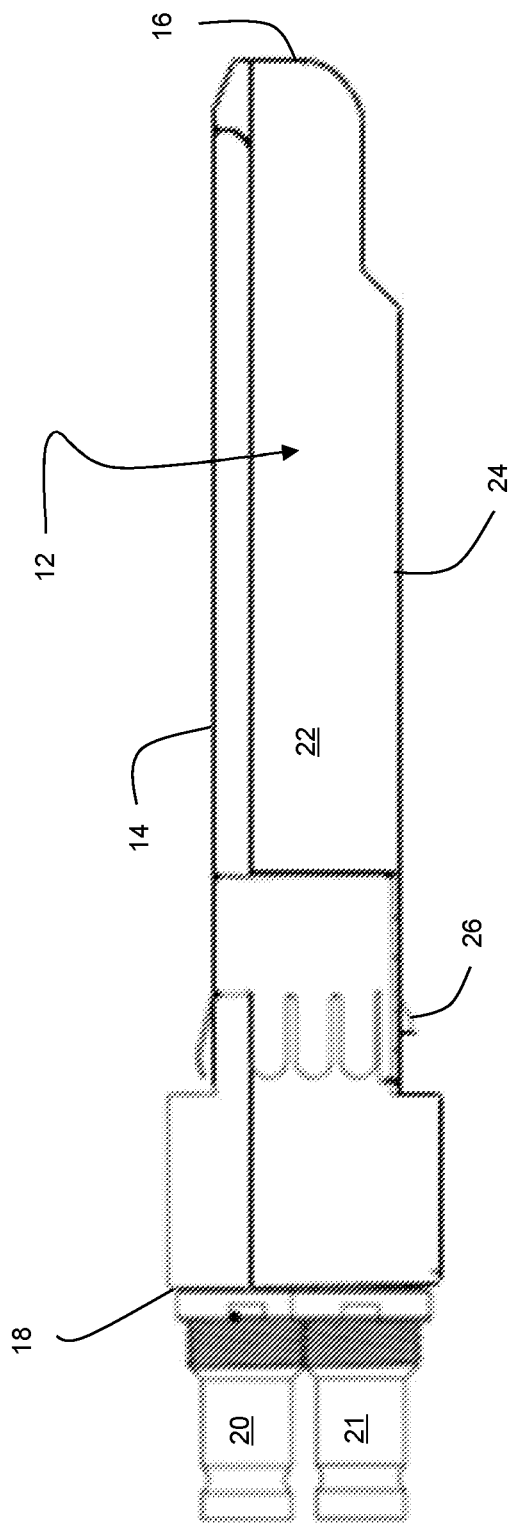
FIG. 2 is a side elevation view of the SFP unit of FIG. 1.
Figure 4:
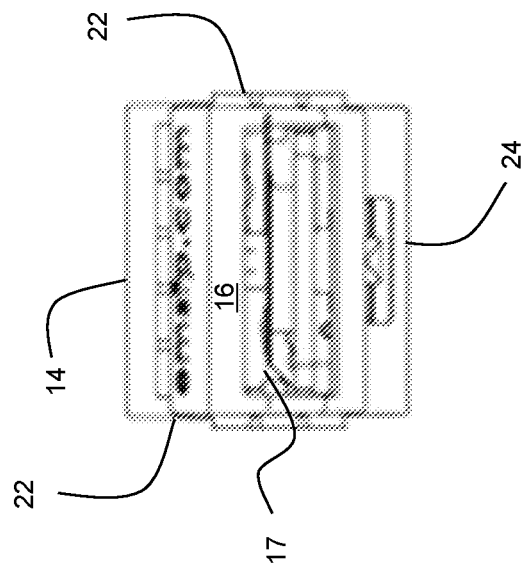
FIG. 4 is back elevation view of the SFP unit of FIG. 1.
Figure 3:
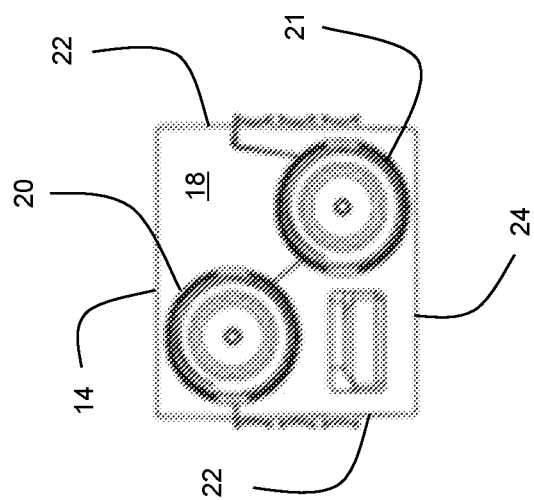
FIG. 3 is a front elevation view of the SFP unit of FIG. 1.
Figure 5:
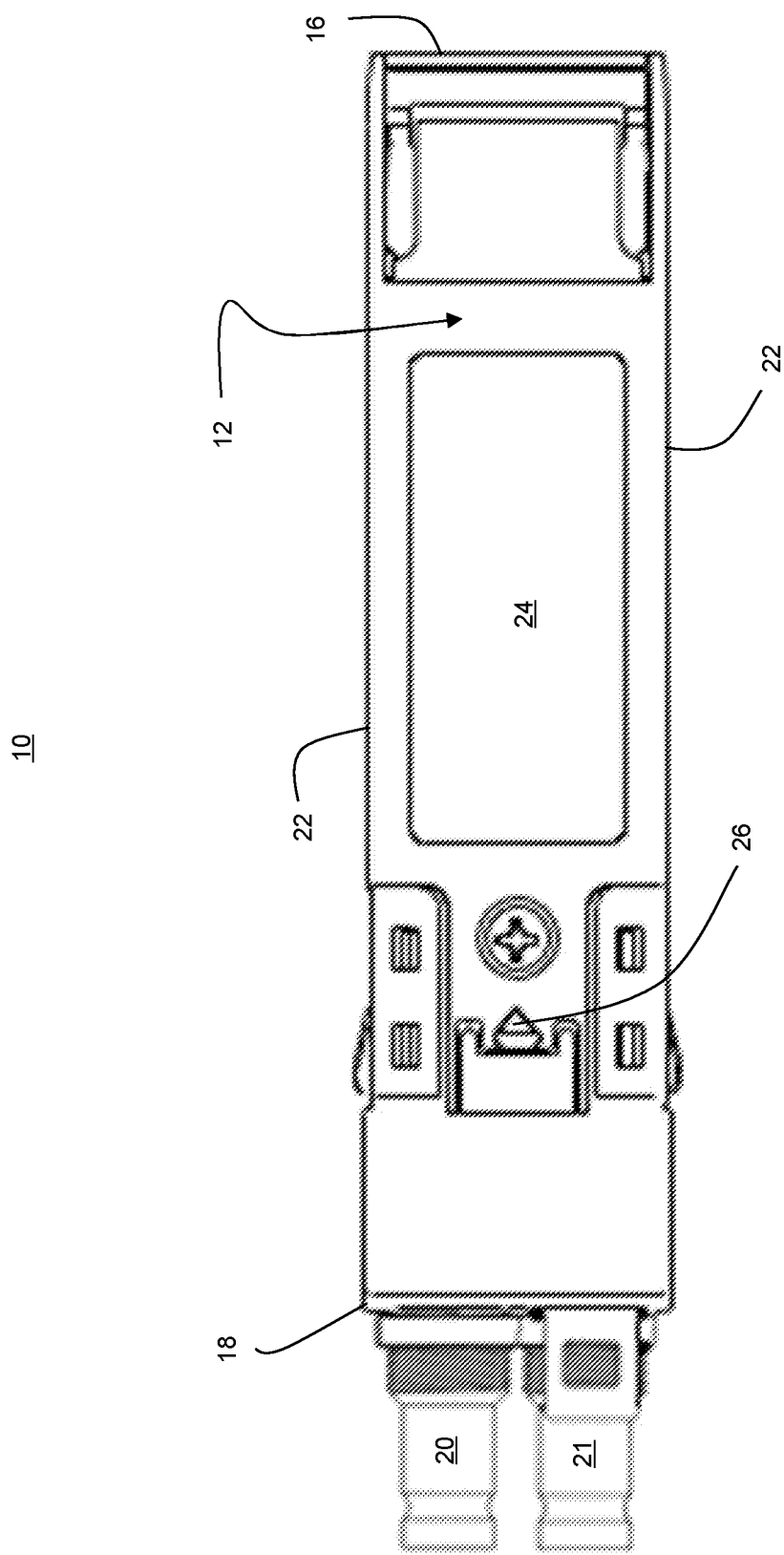
FIG. 5 is a bottom view of the SFP unit of FIG. 1.
Figure 6:
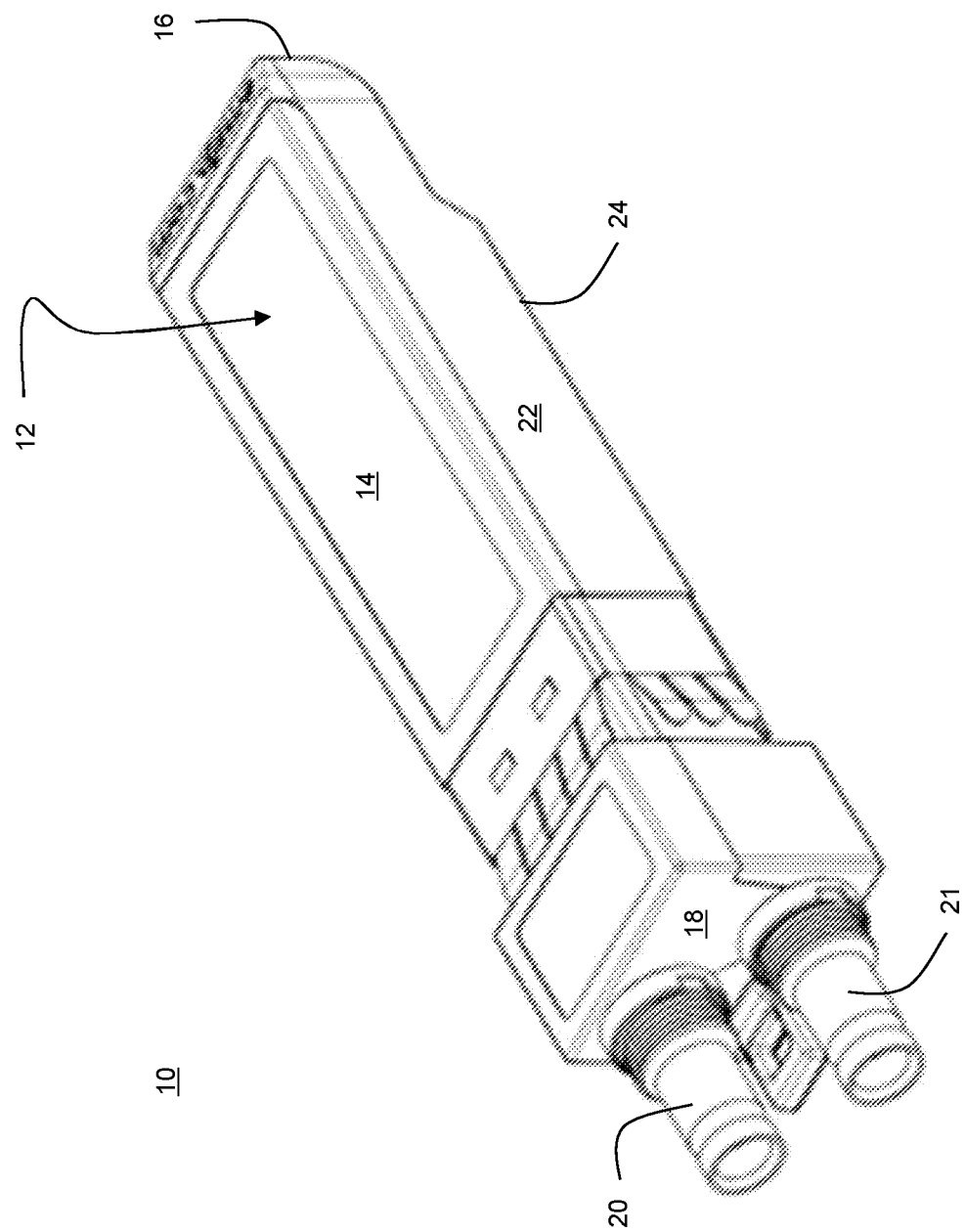
FIG. 6 is a perspective view of the SFP unit of FIG. 1.

The foregoing and other features will become more apparent upon reading of the following non-restrictive description of illustrative embodiments thereof, given by way of example only with reference to the accompanying drawings.

The present disclosure describes standardized hot-pluggable transceiving units, such as Small Form-factor Pluggable (SFP)/SFP+ units, having internal features that far exceed those of conventional units. Conventional units merely provide connection capabilities between a hosting unit in which they are inserted and external apparatuses. The standardized hot-pluggable transceiving unit disclosed herein provides the capability of acting as a gateway between video servers located in a cloud infrastructure, and other equipment which need to access the video data stored on the servers of the cloud infrastructure.

The following terminology is used throughout the present disclosure:

SFP: Small Form-factor Pluggable, this term refers to units that are insertable into a chassis of a hosting unit; in the present disclosure, an SFP unit complies with an industry standard specification.

Connector: A device component for physically joining circuits carrying electrical, optical, radio-frequency, or like signals.

Video signal: Analog or digital signal usable for display purposes, either directly on a monitor, or through multicast or broadcast.

SDI: Serial Digital Interface, a family of digital video interfaces using one or more coaxial cables with Bayonet Neill-Concelman (BNC) connectors, High-Definition BNC (HD-BNC) connectors, Deutsches Institut für Normung (DIN) 1.0/2.3 connectors, etc.

SMPTE: A family of digital video transmission standards published by the Society of Motion Picture and Television Engineers (SMPTE).

In the rest of the disclosure, an SFP unit is used to illustrate an example of a standardized hot-pluggable transceiving unit. However, the teachings of the present disclosure are not limited to an SFP unit, and can be applied to any type of standardized hot-pluggable transceiving unit.

An SFP unit comprises a housing having a front panel, a back panel, a top, a bottom and two sides. Generally, the front panel includes at least one front connector for connecting a cable, a fiber, twisted pairs, etc. The back panel includes at least one rear connector for connecting to a hosting unit. However, as will be illustrated later in the present disclosure, the SFP unit may have no front connector, or alternatively no rear connector. The SFP unit may be fully-compliant or partially compliant with standardized SFP dimensions, such as SFP, SFP+, XFP (SFP with 10 Gigabit/s data rate), Xenpak, QSFP (Quad (4-channel) SFP with 4×10 Gigabit/s data rate), QSFP+, CFP (C form-factor pluggable with 100 Gigabit/s data rate), CPAK or any other standardized Small Form-factor Pluggable unit. Consequently, in the context of the present disclosure, an SFP unit may correspond to SFP, SFP+, XFP, Xenpak, QSFP, QSFP+, CFP, CPAK, or any other known standards related to Small Form-factor Pluggable units.

Reference is now made concurrently to FIGS. 1-6, which are, respectively, a top view, a side elevation view, a front elevation view, a back elevation view, a bottom view and a perspective view of an SFP unit 10. The SFP unit 10 comprises a housing 12. The housing 12 defines a top 14, a bottom 24, and two sides 22. The housing 12 may be at least partially of dimensions in compliance with at least one of the following standards: SFP, SFP+, XFP, Xenpak, QSFP, QSFP+, CFP, CPAK, etc. Alternatively, the housing 12 has functional dimensions based on at least one of the following standards: SFP, SFP+, XFP, Xenpak, QSFP, QSFP+, CFP, CPAK, etc.

The SFP unit 10 further comprises a back panel 16 affixed to the housing 12. The back panel 16 comprises a rear connector 17, for instance an electrical or an optical connector. In an example, the back panel comprises the rear connector 17 (also named a host interface) suitable to connect the SFP unit 10 to a backplane of a chassis (not shown for clarity purposes) of a hosting unit, as known to those skilled in the art.

The SFP unit 10 further comprises a front panel 18 affixed to the housing 12. The front panel 18 comprises one or more connectors, for example a connector 20 of a co-axial cable type such as SDI, adapted to send and/or receive a digital video signal and a connector 21, also of the co-axial cable type, adapted to send and/or receive a digital data signal. The SFP unit 10 further comprises an engagement mechanism, such as for example a latch 26 as shown in a resting position on the bottom 24 in FIG. 2, for maintaining the SFP unit 10 in place within a chassis.

Referring now concurrently to FIGS. 7A, 7B, 7C, 8A and 8B, a standardized hot-pluggable transceiving unit 100 providing a downstream cloud gateway functionality is represented. As mentioned previously, for illustration purposes, the standardized hot-pluggable transceiving unit consists of a SFP unit; but other types of standardized hot-pluggable transceiving units may be used for implementing the system.

The SFP unit 100 corresponds to the SFP unit 10 represented in FIGS. 1 to 6, and comprises the housing 12, the back panel 16 and the front panel 18.

The SFP unit 100 comprises a first connector for receiving a source video Internet Protocol (IP) flow 101 from a cloud video server 200 located in a cloud infrastructure. Examples of cloud infrastructures include the cloud infrastructure of an Internet Service Provider providing television services and/or video on-demand services, the cloud infrastructure of a corporation offering cloud-based services such as data hosting or on-demand services, etc. The cloud infrastructure may include hundreds or thousands of cloud servers, at least some of them being adapted for providing a video server functionality.

The source video IP flow 101 transports video payloads within IP packets over an IP networking infrastructure deployed between the cloud video server 200 and the SFP unit 100. Such an IP networking infrastructure is well known in the art, and may include gateways, IP switches, edge or core routers, etc. Any type of video payload can be transported by the source video IP flow 101, as will be illustrated later in the description.

An IP flow is well known in the art. It consists of a sequence of IP packets from a source to a destination, delivered via zero, one or more intermediate routing (e.g. a router) or switching equipment (e.g. an IP switch). An IP flow has a physical layer adapted for the transport of IP packets, such as Ethernet, Synchronous Optical Networking (SONET)/Synchronous Digital Hierarchy (SDH), etc. Several protocol layers are involved in the transport of the IP packets of the IP flow, including a physical layer (e.g. optical or electrical), a link layer (e.g. Media Access Control (MAC) for Ethernet), an Internet layer (e.g. IPv4 or IPv6), a transport layer (e.g. User Datagram Protocol (UDP) or Transmission Control Protocol (TCP)), and one or more application layers ultimately embedding a video payload (the video frames transported by the source video IP flow 101). In the context of the present disclosure, the source IP flow 101 uses the TCP transport protocol and the HTTP and/or HTTPS application layer protocols for transporting the video payload. Optionally, the application layers also embed an audio payload and/or a metadata payload. The IP flow provides end-to-end delivery of the video payload over the IP networking infrastructure. The IP flow may be unicast or multicast.

The SFP unit 100 comprises a second connector for outputting a video stream 111 generated based on a processing by the SFP unit 100 of the source video IP flow 101. Various types of video streams 111 can be generated by the SFP unit 100 based on its specific capabilities and characteristics, as will be illustrated later in the description.

Figure 7A:
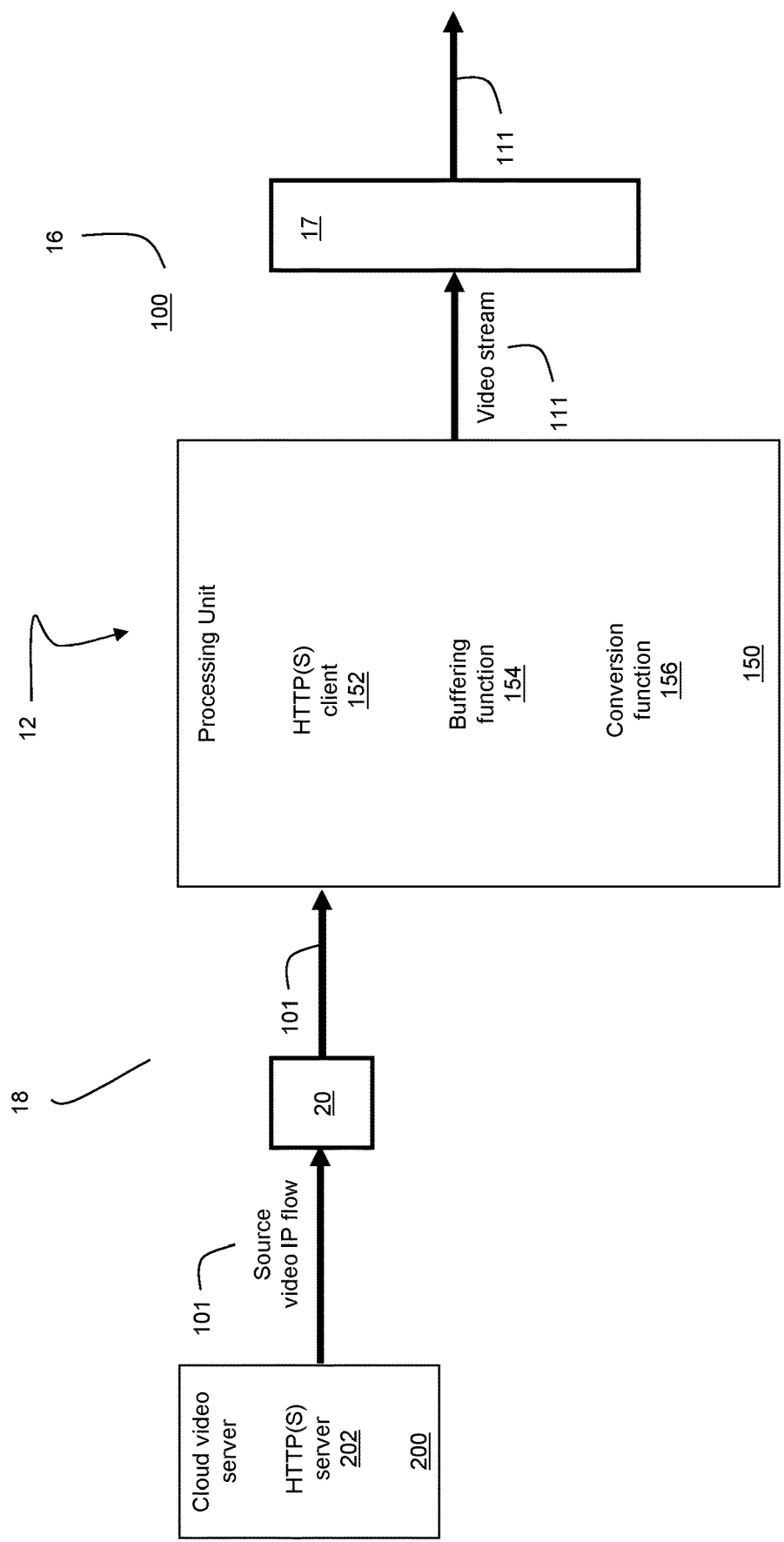
FIGS. 7A, 7B, 7C, 8A and 8B represent several configurations of a SFP unit executing a HTTP client and providing a downstream cloud gateway functionality.

In a first configuration illustrated in FIG. 7A, the first connector receiving the source video IP flow 101 is a front connector 20 located on the front panel 18 of the housing 12 of the SFP unit 100. The second connector outputting the video stream 111 is a host interface 17 located on the back panel 16 of the housing 12. The SFP unit 100 may include additional front connectors located on the front panel 18 of the housing 12 (not represented in FIG. 7A for simplification purposes). For example, the SFP unit 100 has four front connectors (Quad SFP) of electrical or optical type with an aggregate bandwidth of at least 40 Gbps. More than one front connector can be used for receiving a plurality of source video IP flows 101 processed by the SFP unit 100 for generating a corresponding plurality of video streams 111 outputted via the host interface 17.

Figure 7B:
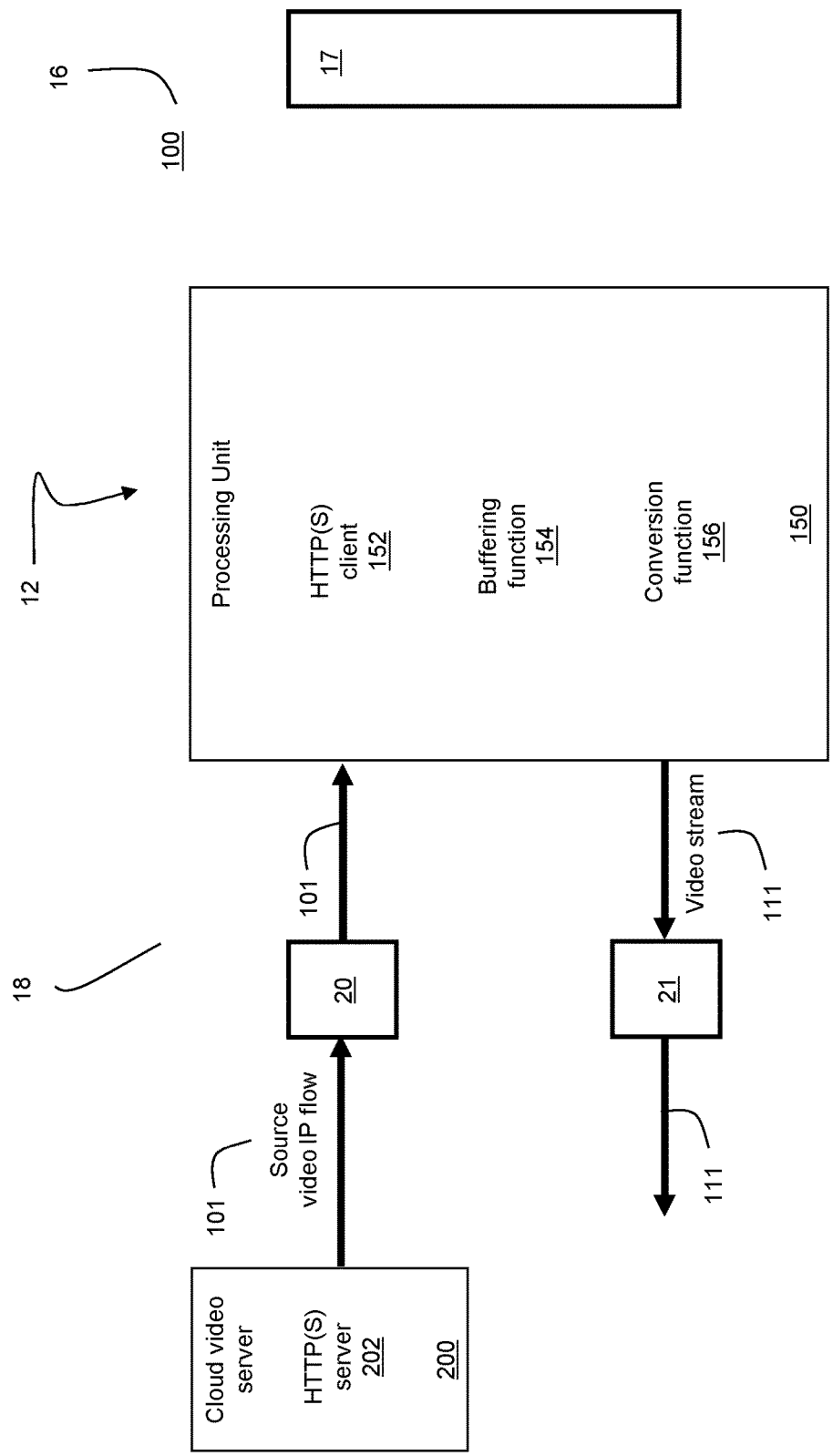

In a second configuration illustrated in FIG. 7B, the first connector receiving the source video IP flow 101 is the front connector 20 located on the front panel 18 of the housing 12. The second connector outputting the video stream 111 is another front connector 21 located on the front panel 18 of the housing 12. The SFP unit 100 may include additional front connectors located on the front panel 18 of the housing 12 (not represented in FIG. 7B for simplification purposes). More than one front connector can be used for receiving a plurality of source video IP flows 101 processed by the SFP unit 100 for generating a corresponding plurality of video streams 111, and more than one front connector can be used for outputting the corresponding plurality of video streams 111.

Figure 7C:
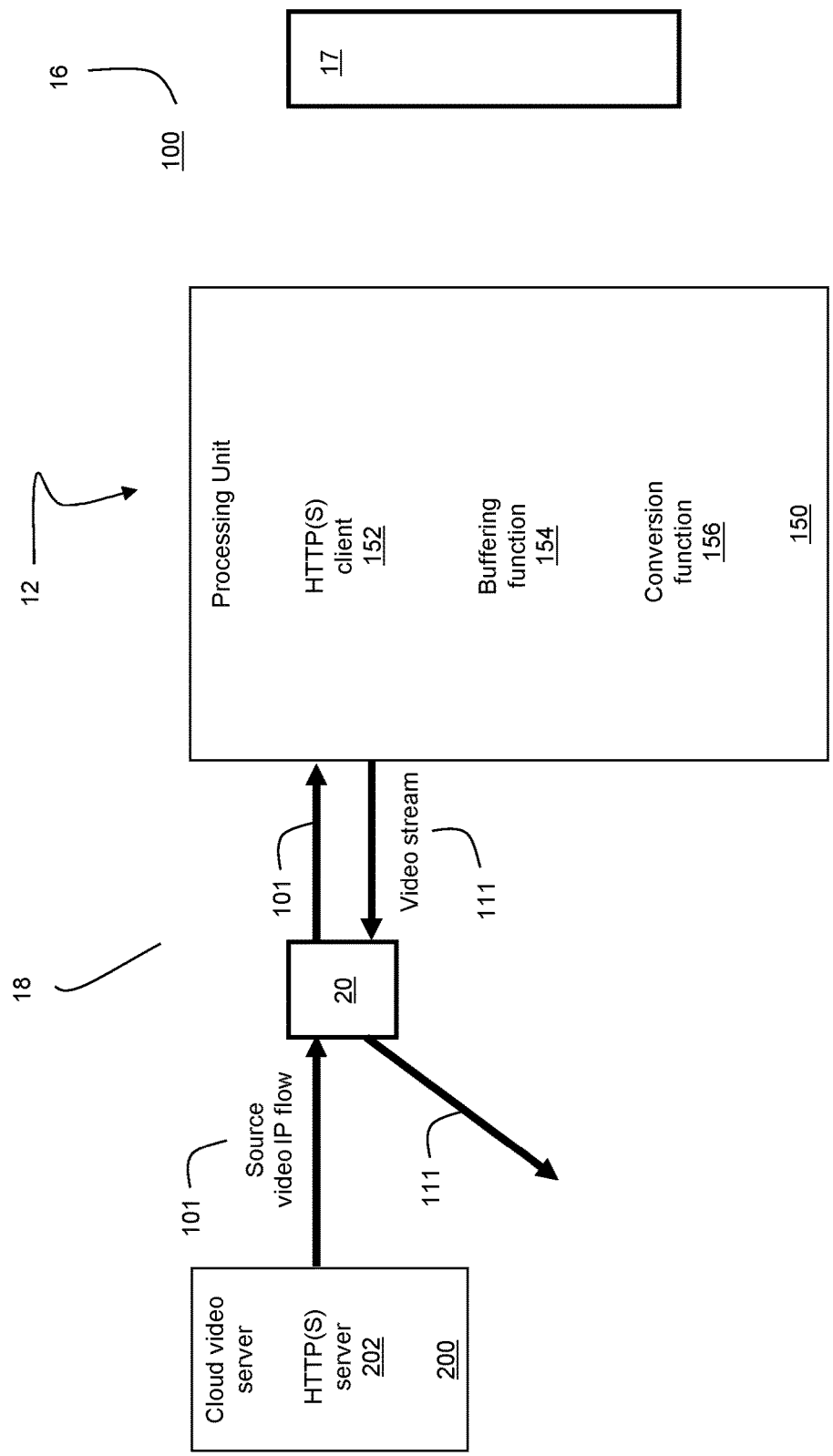

In a third configuration illustrated in FIG. 7C, the first connector receiving the source video IP flow 101 is the front connector 20 located on the front panel 18 of the housing 12. The second connector outputting the video stream 111 is the same front connector 20 which received the source video IP flow 101. The SFP unit 100 may include additional front connectors located on the front panel 18 of the housing 12 (not represented in FIG. 7C for simplification purposes). More than one front connector can be used for receiving a plurality of source video IP flows 101 processed by the SFP unit 100 for generating a corresponding plurality of video streams 111, and outputting the corresponding plurality of video streams 111.

Figure 8A:
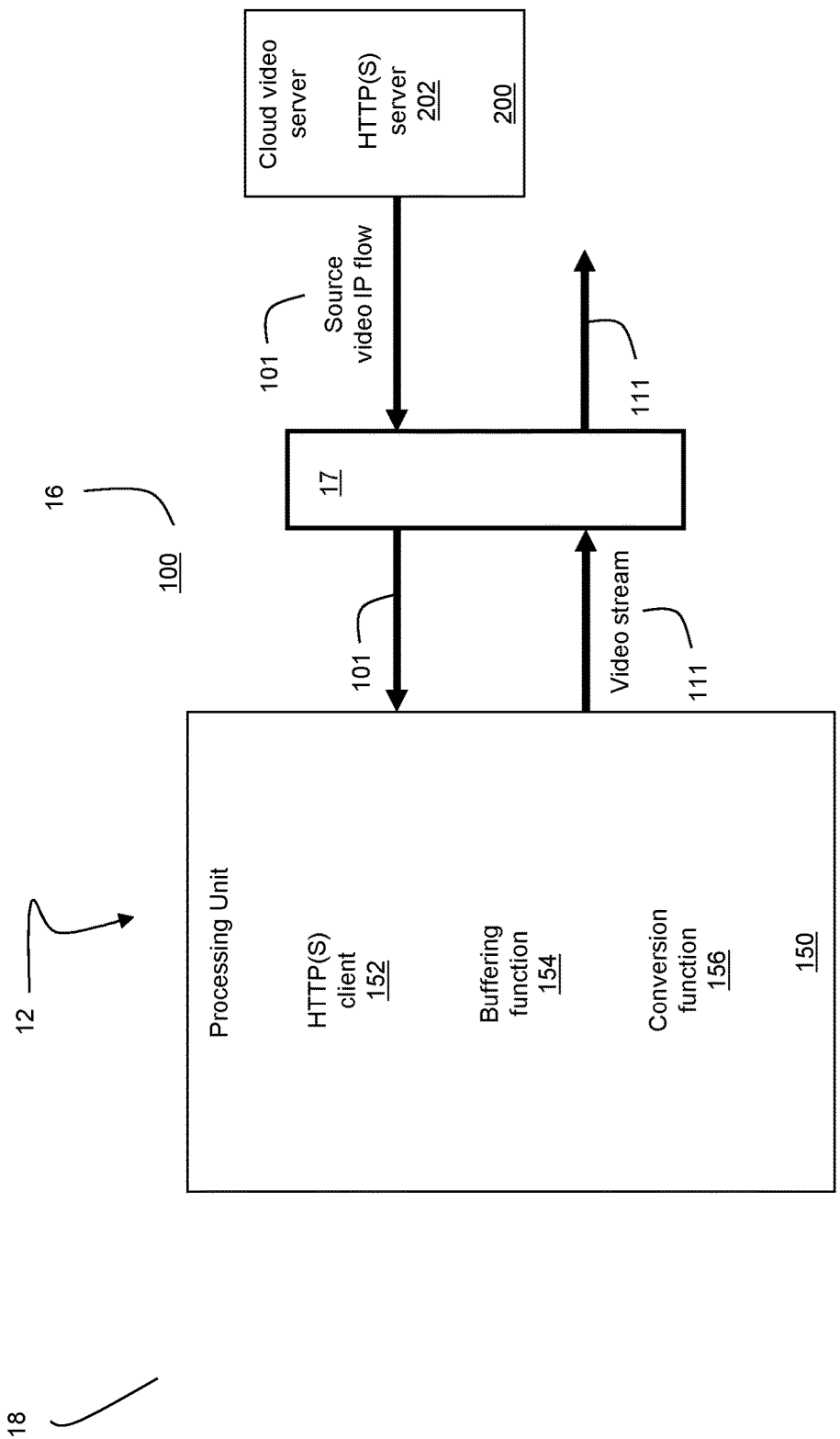

In a fourth configuration illustrated in FIG. 8A, the first connector receiving the source video IP flow 101 is the host interface 17 located on the back panel 16 of the housing. The second connector outputting the video stream 111 is also the host interface 17 located on the back panel 16 of the housing 12. In this configuration, the SFP unit 100 does not have any front connector located on the front panel 18 of the housing 12. Alternatively, the SFP unit 100 has at least one front connector (not represented in FIG. 8A) located on the front panel 18 of the housing 12, which can be used for other purposes than the cloud gateway functionality implemented by the SFP unit 100.

Figure 8B:
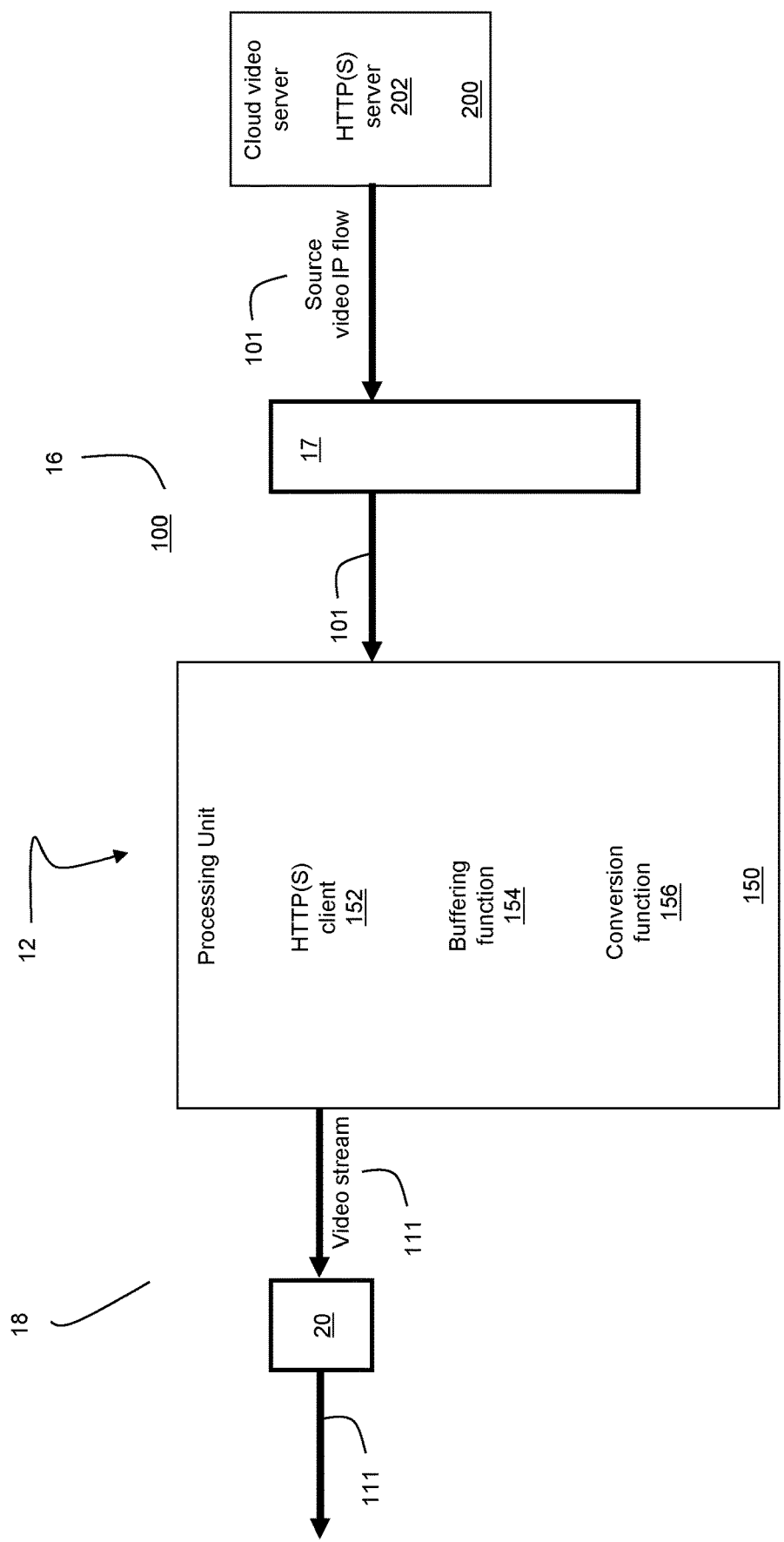

In a fifth configuration illustrated in FIG. 8B, the first connector receiving the source video IP flow 101 is the host interface 17 located on the back panel 16 of the housing. The second connector outputting the video stream 111 is the front connector 20 located on the front panel 18 of the housing 12. The SFP unit 100 may include additional front connectors located on the front panel 18 of the housing 12 (not represented in FIG. 8B for simplification purposes). More than one front connector can be used for outputting a plurality of video streams 111 corresponding to a plurality of source video IP flows received via the host interface 17 and processed by the SFP unit 100.

The SFP unit 100 comprises at least one processing unit 150 for executing several functions implementing the downstream cloud gateway functionality. A single processing unit 150 is represented in the Figures for executing the functions (e.g. a Hypertext Transfer Protocol (HTTP) client 152 and a conversion function 156) implementing the downstream cloud gateway functionality. However, the SFP unit 100 may include several processing units 150, and the functions implementing the cloud gateway functionality may be spread across the several processing units 150 (e.g. the HTTP client 152 is executed by a first processing unit 150, and the conversion function 156 is executed by a second processing unit 150). The processing unit 150 includes one or more processor, memory, and optionally hardware components having dedicated signal processing capabilities.

As is well known in the art, the HTTP client 152 and the HTTP server 202 support both the HTTP and the HTTPS protocols for exchanging data. Thus, in the rest of the description, when referring to the HTTP client 152, it is implied that the HTTP client 152 supports any one of the HTTP or HTTPS protocols.

Other functionalities related to the processing of the signals (e.g. electrical or optical signals, analog or digital signals, etc.) received and outputted by the SFP unit 100 via the front connector(s) 20/21 and the host interface 17 may include an optical to electrical conversion functionality, an electrical to optical conversion functionality, a Digital to Analog Converter (DAC) functionality, an Analog to Digital Converter (ADC) functionality, a serializing functionality, a de-serializing functionality, a re-clocking functionality, etc. Although not represented in the Figures for simplification purposes, at least some of these functionalities are implemented by the SFP unit 100 as is well known in the art. These functionalities are implemented by dedicated signal processing unit(s) not represented in the Figures for simplification purposes, by the at least one processing unit 150, or by a combination of these.

The processing unit 150 executes the HTTP client 152, and the cloud video server 200 executes a HTTP server 202. The HTTP server 202 provides access to video data stored at the cloud video server 200. The HTTP client 152 first establishes a connection with the HTTP server 202. Then, the HTTP client 152 receives the source video IP flow 101 from the HTTP server 202.

The first step consisting in establishing a connection between the HTTP client 152 and the HTTP server 202 is well known in the art. The HTTP protocol, the Hypertext Transfer Protocol Secure (HTTPS) protocol, or a combination of both the HTTP and HTTPS protocols, is used during this first step. Since the HTTP (or HTTPS) protocol is a protocol transported by the connection oriented TCP layer, it includes a first phase were networking parameters of the underlying TCP connection(s) are negotiated between the HTTP client 152 and the HTTP server 202. Additionally, during the first step, the HTTP client 152 may be required to provide credentials to the HTTP server 202, in order to gain access to some of the video data hosted by the HTTP server 202. The credentials can take various forms, including a login/password, a certificate, etc. During the first step, the HTTP client 152 also provides an identification of the video data hosted by the HTTP server 202, which are requested by the HTTP client 152 for transmission to the SFP unit 100.

The second step consisting in transmitting the video data requested by the HTTP client 152 from the HTTP server 202 to the HTTP client 152 is also well known in the art. The source video IP flow 101 transports the video data requested by the HTTP client 152 via the HTTP (or HTTPS) connection established between the HTTP client 152 and the HTTP server 202 at the first step. One of the HTTP or the HTTPS protocol is used by the source video IP flow 101. Video payloads comprising the video data requested by the HTTP client 152 and hosted by the HTTP server 202 are transported by the source video IP flow 101.

For example, in the first step, a HTTP_GET request and a HTTP_200_OK response are exchanged between the HTTP client 152 and the HTTP server 202. Then, in the second step, HTTP_continue and ACK messages are exchanged between the HTTP server 202 and the HTTP client 152 for transmitting the video data.

As mentioned previously, the source video IP flow 101 is received via the first connector (e.g. front connector 20 in FIGS. 7A, 7B and 7C; host interface 17 in FIGS. 8A and 8B) of the SFP unit 100. The first step consisting in establishing the connection between the HTTP client 152 and the HTTP server 202 is also generally performed through the first connector, but may be performed via another connector supporting the exchange of IP packets.

Optionally, the processing unit 150 executes a buffering function 154 for buffering the video payloads transported by the source video IP flow 101 and received by the HTTP client 152, before the video payloads are processed by the conversion function 156. For example, several video payloads transported by the source video IP flow 101 need to be combined by the conversion function 156, to generate a single video payload transported by the corresponding video stream 111. In this case, the buffering function 154 buffers a number of video payloads transported by the source video IP flow 101 sufficient for the conversion function 156 to operate adequately. For instance, if four video payloads transported by the source video IP flow 101 need to be combined by the conversion function 156, to generate a single video payload transported by the corresponding video stream 111, then the buffering function 154 buffers at least four video payloads transported by the source video IP flow 101, before passing them to the conversion function 156 for further processing.

The processing unit 150 executes the conversion function 156 for generating the video stream 111 based on the source video IP flow 101. The conversion performed by the conversion function 156 depends on the type of generated video stream 111, and on the type of video payloads transported by the source video IP flow 101.

The HTTP client 152 is in charge of extracting the video payloads transported by the source video IP flow 101. The extracted video payloads are passed to the conversion function 156 for being processed (and are optionally buffered by the buffering function 154 as mentioned previously). Alternatively, the HTTP client 152 is only in charge of extracting the HTTP payloads transported by the source video IP flow 101. The extracted HTTP payloads are passed to the conversion function 156, which is in charge of extracting the video payloads from the HTTP payloads. In this case, the buffering function 154 is directly implemented by the conversion function 156.

Although the HTTP client 152, the optional buffering function 154 and the conversion function 156 are represented as separate functional entities in the Figures, at least some of the functions 152, 154 and 156 may be integrated. For example, the optional buffering function 154 and the conversion function 156 are implement as plug-in software modules of a main software program implementing a standard HTTP client functionality 152.

In a first configuration, the video stream 111 is a SDI video signal outputted via a SDI connector (e.g. SDI front connector 21 in FIG. 7B, SDI front connector 20 in FIG. 8B) on the front panel 18 of the SFP unit 100. SDI connectors are adapted to output SDI video signals, and are a family of digital video interfaces using one or more coaxial cables with BNC connectors, HD-BNC connectors, DIN connectors, etc.

In the present description, the term "SDI video signal" refers to a digital video signal compliant with the SDI standard. It encompasses several variants of the SDI standard, including for example SD-SDI, HD-SDI, ED-SDI, 3G-SDI, 6G-SDI, 12G-SDI, etc.; which have all been standardized by the SMPTE organization. An SDI video signal transports an SDI payload, which comprises a video payload carrying a video component of the SDI signal. The SDI payload generally also comprises at least one additional payload, such as an audio payload for carrying an audio component of the SDI signal and/or a metadata payload for carrying a metadata component of the SDI signal.

If the source video IP flow 101 transports source SDI video payloads over the TCP and HTTP (or HTTPS) protocols, the source SDI video payloads are transported in the SDI video signal 111 outputted via the SDI connector. The conversion function 156 performs no video format conversion, and only controls the generation of the SDI video signal 111.

If the source video IP flow 101 transports source video payloads different from the SDI type (e.g. H264 video payloads) over the TCP and HTTP (or HTTPS) protocols, the conversion function 156 converts the source video payloads (e.g. H264 video payloads) of the source video IP flow 101 into SDI video payloads transported in the SDI video signal 111 outputted via the SDI connector.

In a second configuration, the video stream 111 is a High-Definition Multimedia Interface (HDMI) video signal outputted via a HDMI connector (e.g. HDMI front connector 21 in FIG. 7B, HDMI front connector 20 in FIG. 8B) on the front panel 18 of the SFP unit 100. HDMI connectors are adapted to output HDMI video signals, and are well known in the art.

If the source video IP flow 101 transports source HDMI video payloads over the TCP and HTTP (or HTTPS) protocols, the source HDMI video payloads are transported in the HDMI video signal 111 outputted via the HDMI connector. The conversion function 156 performs no video format conversion, and only controls the generation of the HDMI video signal 111.

If the source video IP flow 101 transports source video payloads different from the HDMI type (e.g. H264 video payloads or SDI video payloads) over the TCP and HTTP (or HTTPS) protocols, the conversion function 156 converts the source video payloads (e.g. H264 video payloads or SDI video payloads) of the source video IP flow 101 into HDMI video payloads transported in the HDMI video signal 111 outputted via the HDMI connector.

In a third configuration, the video stream 111 is also a video IP flow (referred to as the outgoing video IP flow 111), but with characteristics different from the source video IP flow 101. The second connector for outputting the outgoing video IP flow 111 is adapted for transporting IP packets. The second connector is the host interface 17, as illustrated in FIGS. 7A and 8A. Alternatively, the second connector is a front connector, as illustrated in FIGS. 7B (front connector 21), 7C (front connector 20) and 8B (front connector 20).

For instance, the outgoing video IP flow 111 uses the UDP protocol, which is a commonly used protocol for transporting video over IP in a networking infrastructure. The SFP unit 100 provides a TCP to UDP conversion function (implemented by the conversion function 156) for transporting video over IP. The RTP protocol can be used on top of the UDP protocol for transporting the video payloads of the outgoing video IP flow 111. Thus, the SFP unit 100 may provide various types of IP protocols conversion functions, such as TCP/HTTP to UDP, TCP/HTTPS to UDP, TCP/HTTP to UDP/RTP, TCP/HTTPS to UDP/RTP, etc. Each video payload transported by the source video IP flow 101 is simply transported by the corresponding outgoing video IP flow 111. Alternatively, several video payloads transported by the source video IP flow 101 are combined into a single video payload transported by the corresponding outgoing video IP flow 111 (the buffering function 154 is used in this context). In still another alternative, each video payload transported by the source video IP flow 101 is split in a plurality of video payloads transported by the corresponding outgoing video IP flow 111.

The same type of video payloads can be transported by the source video IP flow 101 and the outgoing video IP flow 111. The conversion function 156 performs no video format conversion, and only controls the generation of the outgoing video IP flow 111. Alternatively, the conversion function 156 also converts a first type of video payloads transported by the source video IP flow 101 into a second type of video payloads transported by the outgoing video IP flow 111.

For example, the source video IP flow 101 transports H264 video payloads over the TCP and HTTP (or HTTPS) protocols, and the outgoing video IP flow 111 transports the H264 video payloads over the UDP protocol. Alternatively, the conversion function 156 converts the H264 video payloads of the source video IP flow 101 into another type of video payloads (e.g. SDI video payloads) transported by the outgoing video IP flow 111.

In another example, the source video IP flow 101 transports SDI video payloads over the TCP and HTTP (or HTTPS) protocols, and the outgoing video IP flow 111 transports the SDI video payloads over the UDP protocol. Alternatively, the conversion function 156 converts the SDI video payloads of the source video IP flow 101 into another type of video payloads (e.g. H264 video payloads) transported by the outgoing video IP flow 111.

In a particular aspect, the outgoing video IP flow 111 conforms to one of the following standards: the SMPTE 2022-5 standard, the SMPTE 2022-6 standard, and the SMPTE 2022-7 standard. These three standards can be used singly or in combination for transporting SDI payloads (e.g. SDI video payloads and corresponding SDI audio payloads) over IP. The SMPTE 2022-5 standard provides a Forward Error Correction (FEC) scheme for compensating potential IP packet losses of an IP flow transporting SDI payloads, since IP networks do not provide a guaranteed delivery of all transmitted IP packets. The SMPTE 2022-6 standard provides transport of SDI payloads via the Real-time Transport Protocol (RTP). It also provides an additional protocol layer on top of the RTP layer: the High-Bitrate Media Transport Protocol (HBRMT) protocol layer, which supports a high-precision clock and extra metadata. The SMPTE 2022-7 standard provides seamless protection switching to an IP flow transporting SDI payloads, by sending two matching streams of IP packets from a source to a destination over different paths, and have the receiver switch automatically between them. Alternatively (or concurrently), the outgoing video IP flow 111 conforms to one of the SMPTE 2110 standards, such as SMPTE2110-10, SMPTE2110-20, SMPTE2110-21, SMPTE 2110-30, SMPTE2110-40, SMPTE2110-50, etc. For example, in some cases, the outgoing video IP flow 111 conforms to a combination of one of the SMPTE2022 standard family and one of the SMPTE2110 standard family.

Reference is now made concurrently to FIGS. 9A, 9B, 10A and 10B, where a plurality of HTTP clients (e.g. 152 and 152') are executed by the processing unit 150. Only two HTTP clients 152 and 152' are represented in FIGS. 9A, 9B, 10A and 10B for simplification purposes. However, a larger number of HTTP clients may be executed in parallel. Furthermore, FIGS. 9A, 9B, 10A and 10B represent all the HTTP clients (e.g. 152 and 152') being executed by the same processing unit 150. However, the execution of the HTTP clients may be spread across a plurality of processing units 150 of the SFP unit 100.

Furthermore, although not represented in the Figures for simplification purposes, a plurality of conversion functions 156 may also be executed in parallel, either by a single processing unit 150, or spread across a plurality of processing units 150. A given conversion function 156 is dedicated to one or more given HTTP clients 152. Alternatively, each conversion function 156 is capable of processing video payloads received by any of the HTTP clients 152.

Figure 9A:
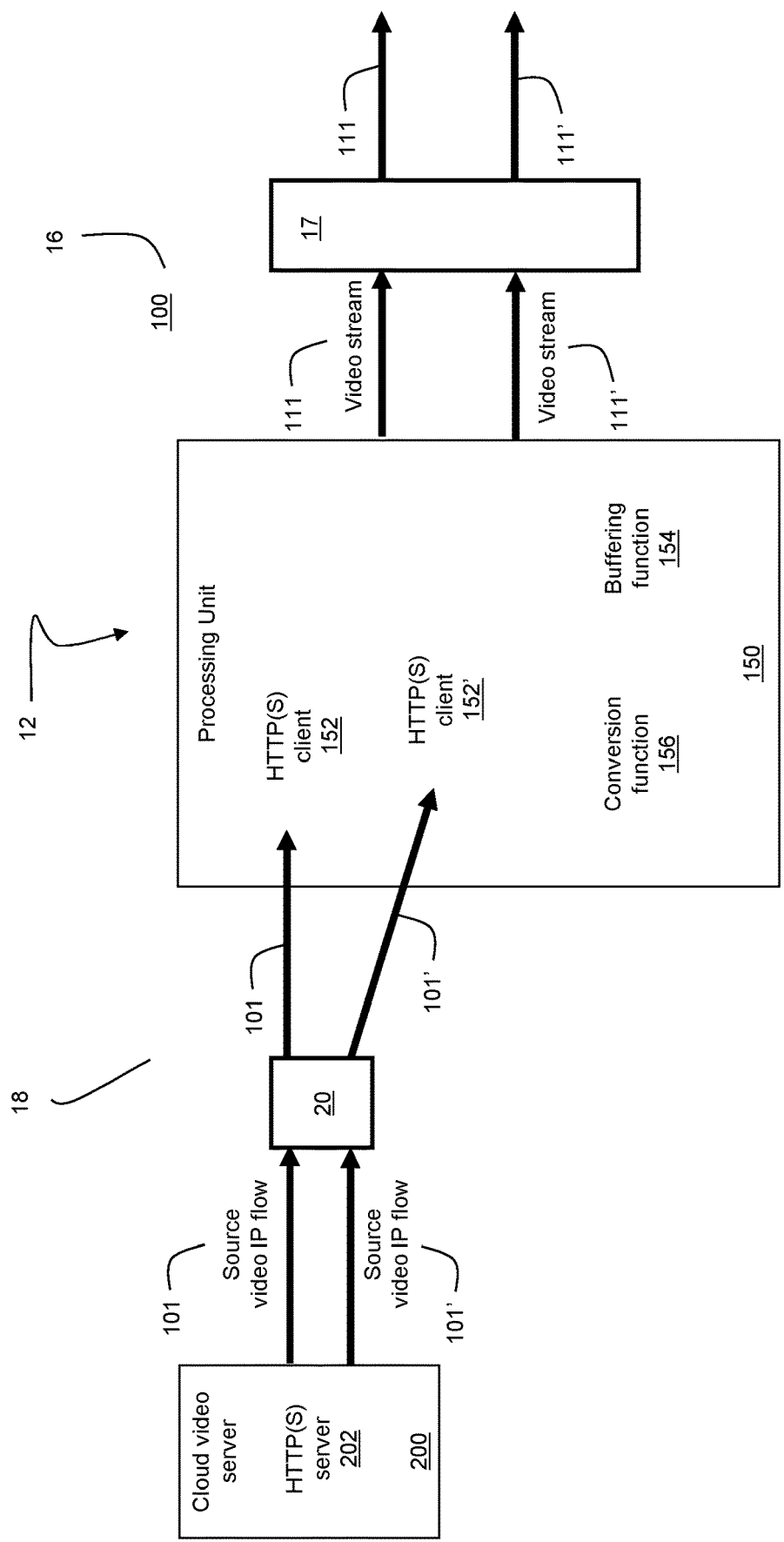
FIGS. 9A, 9B, 10A and 10B represent several configurations of a SFP unit executing a plurality of HTTP clients and providing a downstream cloud gateway functionality.

Reference is now made more particularly to FIG. 9A. The plurality of HTTP clients (e.g. 152 and 152') establishes a corresponding plurality of connections with the HTTP server 202 hosted by the cloud video server 200. The plurality of HTTP clients (e.g. 152 and 152') receive a corresponding plurality of source video IP flows (e.g. 101 and 101') from the HTTP server 202 via the first connector (e.g. front connector 20 in FIG. 9A) of the SFP unit 100. The plurality of source video IP flows (e.g. 101 and 101') uses one of the HTTP or the HTTPS protocol for transporting their video payloads from the cloud video server 200 to the SFP unit 100. The conversion function 156 generates a corresponding plurality of video streams (e.g. 111 and 111') based on the plurality of source video IP flows (e.g. 101 and 101'). For example, the video stream 111 is generated based on the source video IP flow 101 and the video stream 111' is generated based on the source video IP flow 101'.

FIG. 9A represents the plurality of video streams (e.g. 111 and 111') generated by the conversion function 156 being outputted via the same connector (e.g. the host interface 17 in FIG. 9A). However, the plurality of video streams (e.g. 111 and 111') generated by the conversion function 156 may be outputted via different connectors (e.g. the front connectors 20 and 21 (not represented in FIG. 9A for simplification purposes) of the SFP unit 100). Similarly, FIG. 9A represents the plurality of source video IP flows (e.g. 101 and 101') being received via the same connector (e.g. the front connector 20 in FIG. 9A). However, the plurality of source video IP flows (e.g. 101 and 101') may be received via different connectors (e.g. the front connectors 20 and 21 (not represented in FIG. 9A for simplification purposes) of the SFP unit 100).

Furthermore, at least one of the HTTP clients (e.g. 152) may be receiving a plurality of source video IP flows (e.g. 101) simultaneously from the HTTP server 202.

Figure 9B:
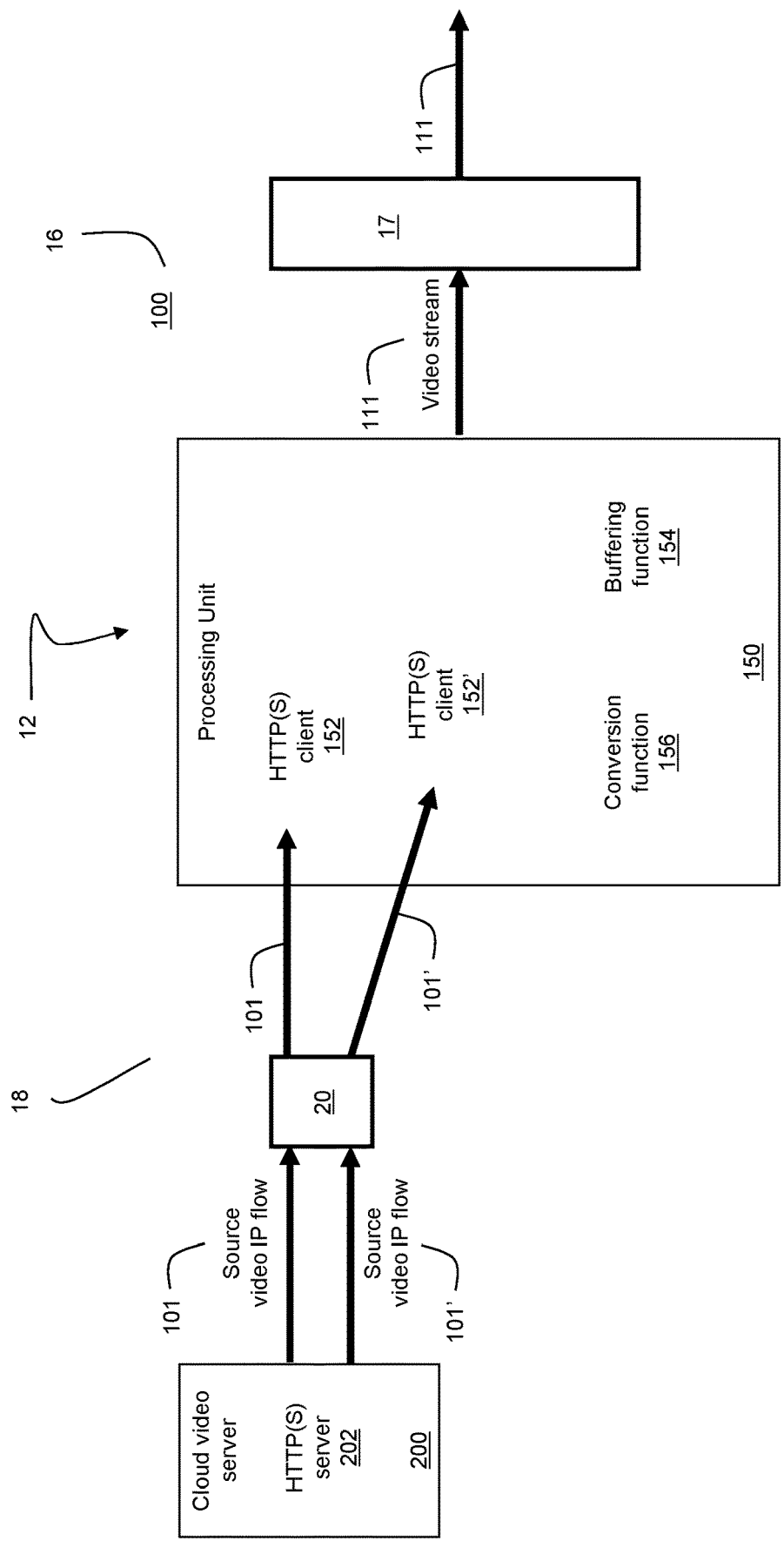

Reference is now made more particularly to FIG. 9B. FIG. 9B is similar to FIG. 9A, except for the conversion function 156 which generates a single video stream 111 based on the plurality of source video IP flows (e.g. 101 and 101'). For example, in FIG. 9B, the video stream 111 is generated based on the source video IP flow 101 and the source video IP flow 101'.

For example, the conversion function 156 scales the source video payloads of the plurality of source video IP flows (e.g. 101 and 101'), and combines the scaled source video payloads into scaled outgoing video payloads transported by the outgoing video stream 111. Alternatively or complementarily, the conversion function 156 combines the source video payloads of the plurality of source video IP flows (e.g. 101 and 101') into mosaiced video payloads transported by the outgoing video stream 111; each of the source video payloads having a given position within the mosaiced video payloads. The SFP unit 100 can receive a command from a third-party computing device (as will be illustrated later in the description) to specify the given position of each of the source video payloads within the mosaiced video payloads.

Figure 10A:
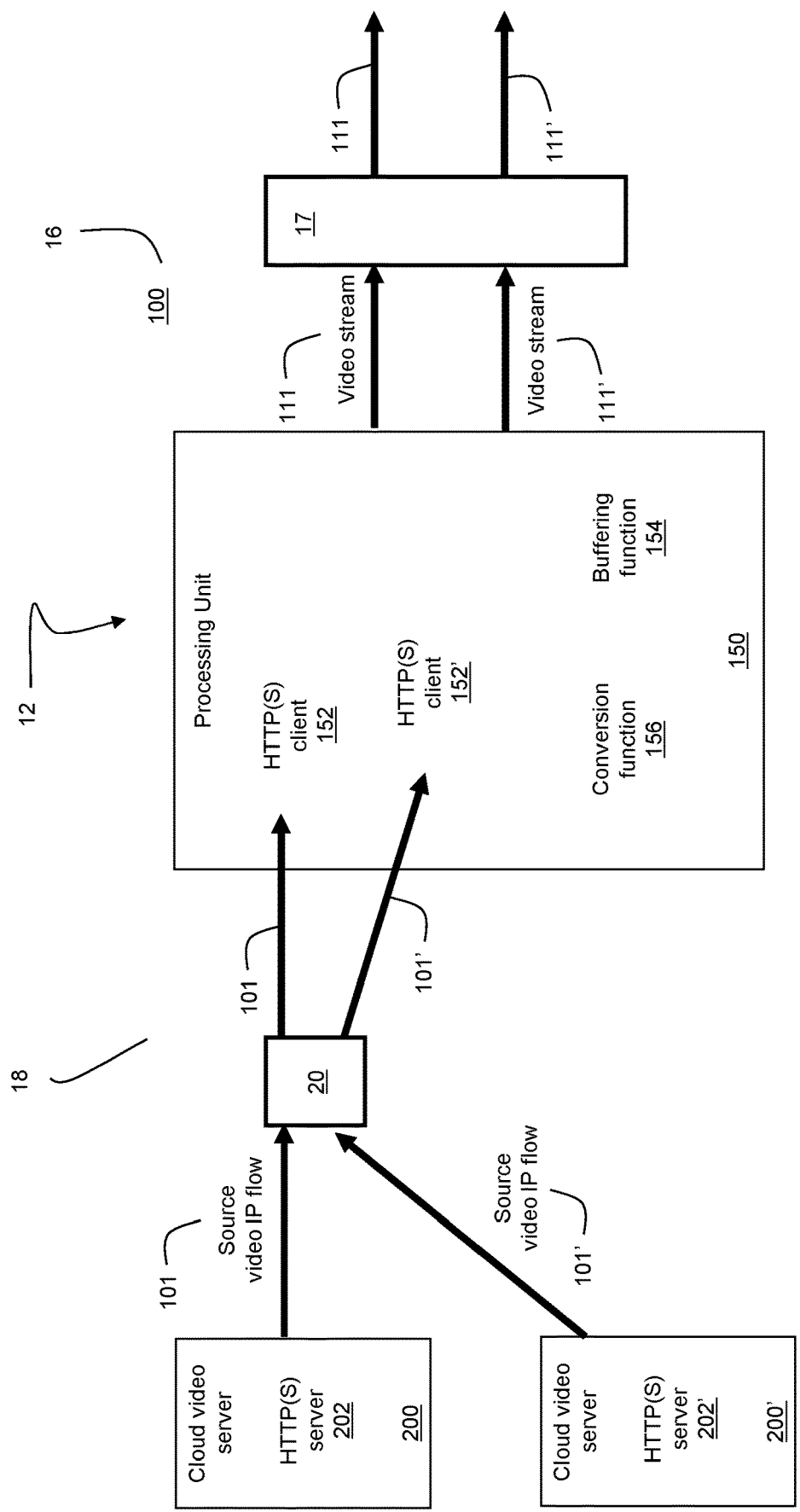

Reference is now made more particularly to FIG. 10A. The plurality of HTTP clients (e.g. 152 and 152') establish a corresponding plurality of connections with respectively one among several HTTP servers (e.g. 202 and 202') respectively hosted by several cloud video servers (e.g. 200 and 200'). The plurality of HTTP clients (e.g. 152 and 152') receive a corresponding plurality of source video IP flows (e.g. 101 and 101') from the HTTP servers (e.g. 202 and 202') via the first connector (e.g. front connector 20 in FIG. 10A) of the SFP unit 100. The plurality of source video IP flows (e.g. 101 and 101') uses one of the HTTP or the HTTPS protocol for transporting their video payloads from the cloud video servers (e.g. 200 and 200') to the SFP unit 100. The conversion function 156 generates a corresponding plurality of video streams (e.g. 111 and 111') based on the plurality of source video IP flows (e.g. 101 and 101'). For example, the video stream 111 is generated based on the source video IP flow 101 received from the cloud video server 200, and the video stream 111' is generated based on the source video IP flow 101' received from the cloud video server 200'. Only two cloud video servers 200 and 200' have been represented in FIG. 10A for simplification purposes. However, more than two cloud video servers may be transmitting source video IP flows to the SFP unit 100.

FIG. 10A represents the plurality of video streams (e.g. 111 and 111') generated by the conversion function 156 being outputted via the same connector (e.g. the host interface 17 in FIG. 10A). However, the plurality of video streams (e.g. 111 and 111') generated by the conversion function 156 may be outputted via different connectors (e.g. the front connectors 20 and 21 (not represented in FIG. 10A for simplification purposes) of the SFP unit 100). Similarly, FIG. 10A represents the plurality of source video IP flows (e.g. 101 and 101') being received via the same connector (e.g. the front connector 20 in FIG. 10A). However, the plurality of source video IP flows (e.g. 101 and 101') may be received via different connectors (e.g. the front connectors 20 and 21 (not represented in FIG. 10A for simplification purposes) of the SFP unit 100).

Furthermore, at least one of the HTTP clients (e.g. 152) may be receiving a plurality of source video IP flows (e.g. 101) simultaneously from the same HTTP server (e.g. 202) hosted by one of the cloud video servers (e.g. 200). Alternatively, each one of the plurality of HTTP clients (e.g. 152) is dedicated to the reception of a single source video IP flow (e.g. 101) transmitted by one of the HTTP servers (e.g. 202).

Figure 10B:
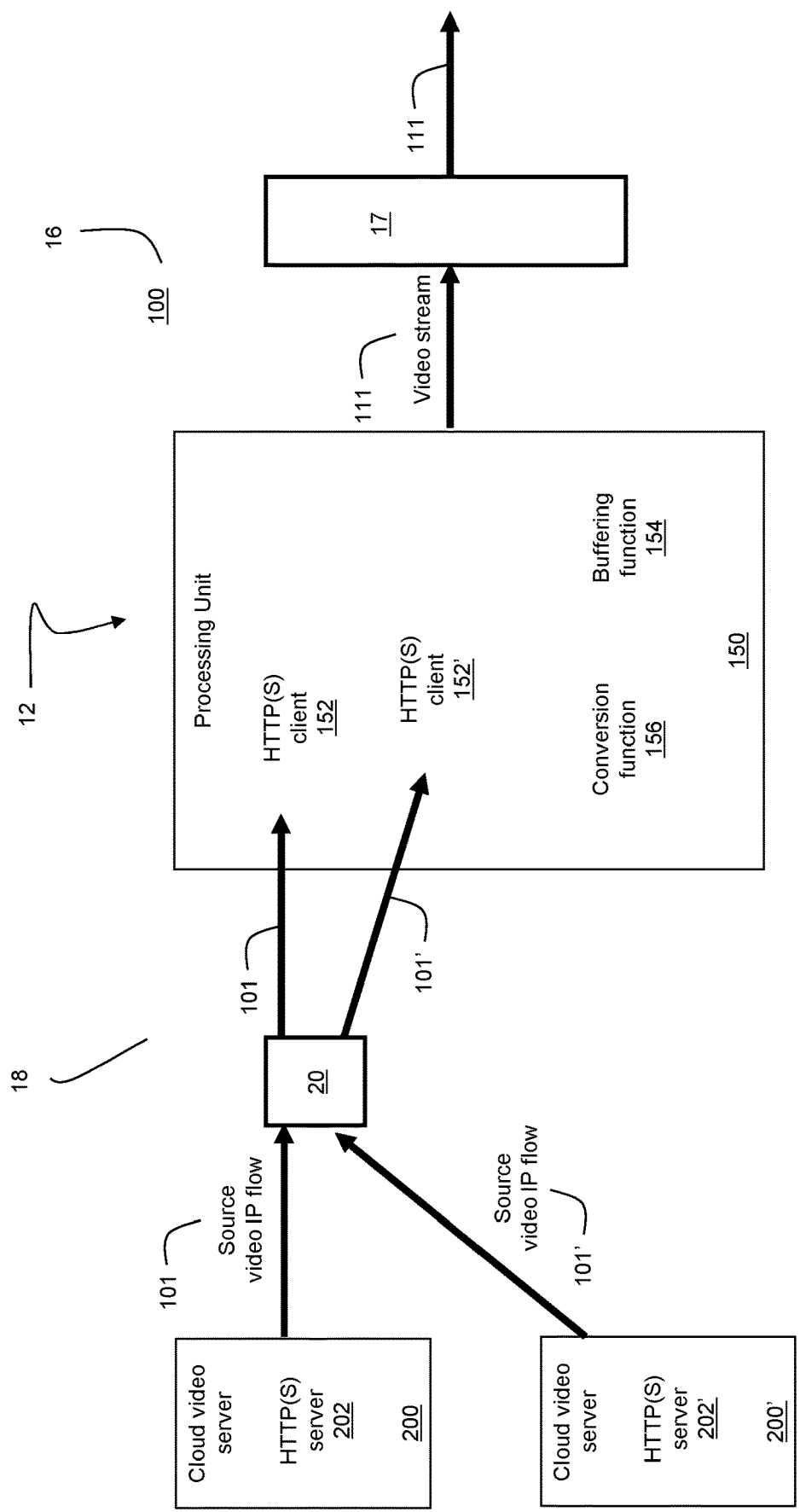

Reference is now made more particularly to FIG. 10B. FIG. 10B is similar to FIG. 10A, except for the conversion function 156 which generates a single video stream 111 based on the plurality of source video IP flows (e.g. 101 and 101'). For example, in FIG. 10B, the video stream 111 is generated based on the source video IP flow 101 received from the HTTP server 202 and the source video IP flow 101' received from the HTTP server 202'.

As mentioned in relation to FIG. 9B, the conversion function 156 may implement a scaling functionality, a mosaicing functionality, or a combination of a scaling and a mosaicing functionality.

Referring now to all of FIGS. 7A to 10B concurrently, a mechanism for remotely controlling the operations of the SFP unit 100 will be described.

The SFP unit 100 receives a control message from a third-party computing device (not represented in the Figures). The control message comprises one or more parameters for controlling the operations of the HTTP client 152. For example, the control message comprises an identification of the HTTP server 202 hosted by the cloud video server 200 (e.g. an IP address, a Uniform Resource Locator (URL), etc.), an identification of the video payloads to be transmitted via the source video IP flow 101, credentials for obtaining access to the HTTP server 202, etc. Alternatively or complementarily, the control message comprises one or more parameters for controlling the operations of the conversion function 156. For example, the control message comprises characteristics of the outgoing video stream 111 (e.g. destination IP address and destination IP port when the outgoing video stream 111 is an outgoing video IP flow). Additionally, the control message may comprise parameter (s) defining how the source video payloads of the source video IP flow 101 are processed to generate the outgoing video payloads of the outgoing video stream 111 (e.g. applying a scaling ratio, identifying several source video payloads corresponding to several source video IP flows 101 to be combined in outgoing video payloads transported by a single outgoing video stream 111, etc.).

The third-party computing device for controlling the operations of the SFP unit 100 includes a user interface, allowing a user to enter user commands. The user commands are processed by the third-party computing device to generate the control message transmitted to the SFP unit 100. The control message can be transported via the IP protocol. Upon reception of the control message (e.g. via the host interface 17 or via a front connector (e.g. 20 or 21) of the SFP unit 100), the processing unit 150 interprets the received control message, and controls the operations of the SFP unit 100 accordingly. The control message may be compliant with a standardized Control Plane Signaling protocol, such as the Simple Network Management Protocol (SNMP), OpenFlow, Internet Group Management Protocol (IGMP), etc. Alternatively, the control message is compliant with a proprietary Control Plane Signaling protocol.

As mentioned previously, additional data (e.g. audio payloads, metadata payloads, a combination thereof, etc.) may be transported by the source video IP flow 101. Metadata payloads comprise at least one of the following: closed caption text, subtitle text, rating text, a time code (e.g. for indicating a time interval before a program goes live), a Vertical Blanking Interval (VBI), V-chip rating, etc. The additional data are either included in the video payloads transported by the source video IP flow 101, or the additional data are transported in dedicated payloads independent from the video payloads. The processing of the additional data by the conversion function 156 depends on the type of video stream 111 generated by the conversion function 156. For example, the additional data are included in the source video payloads transported by the source video IP flow 101, and the conversion function 156 includes the additional data in the outgoing video payloads transported by the outgoing video stream 111. Alternatively, the additional data are included in the source video payloads transported by the source video IP flow 101, and the conversion function 156 generates dedicated outgoing payloads comprising the additional data and transported by the outgoing video stream 111.

Figure 11:
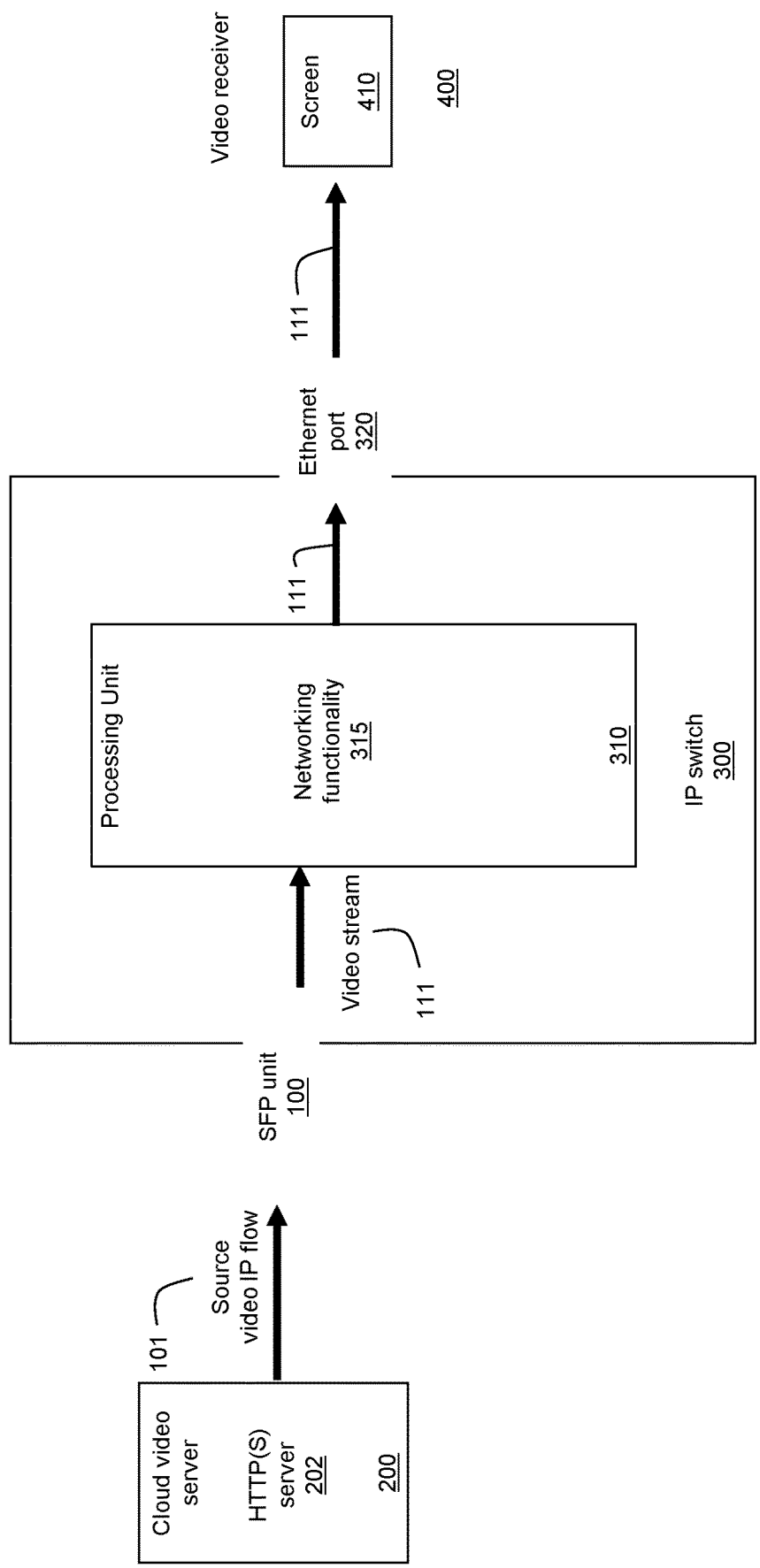
FIG. 11 illustrates an exemplary use case for the usage of the SFP units represented in FIGS. 7A, 9A-B and 10A-B.

Reference is now made concurrently to FIGS. 7A and 11; where FIG. 11 represents an exemplary use case for the usage of the system described in the present disclosure for providing a downstream cloud gateway functionality. For illustration purposes, this exemplary use case corresponds to the system described in relation to FIG. 7A. However, a person skilled in the art could easily adapt it to the system described in relation to FIGS. 7B to 10B.

The SFP unit 100 is inserted in a chassis of an IP switch 300. The IP switch 300 comprises a processing unit 310 implementing a networking functionality 315 (e.g. switching and/or routing). The processing unit 310 receives data packets through various networking interfaces of the IP switch 300, and the networking functionality 315 processes the received data packets to forward these data packets though one of the interfaces of the IP switch 300, as is well known in the art. Other types of equipment may be used in place of the IP switch 300, such as routers, gateways, video servers, etc. The only requirement on these equipment is that they include a chassis adapted for receiving the SFP unit 100. A single SFP unit 100 is represented in FIG. 11 for simplification purposes, but a plurality of SFP units 100 respectively implementing a cloud gateway functionality may be inserted simultaneously in the chassis of the IP switch 300.

The exemplary configuration represented in FIG. 11 corresponds to the configuration represented in FIG. 7A. The source video IP flow 101 is received from the cloud video server 200 via a front connector (e.g. 20) of the SFP unit 100. The IP switch 300 includes an Ethernet port 320 for outputting the video stream 111 generated by the SFP unit 100. The video stream 111 is transmitted from the SFP unit 100 to the networking functionality 315 executed by the processing unit 310 of the IP switch 300 via the host interface 17 of the SFP unit 100.

The video stream 111 generated by the SFP unit 100 is forwarded to a video receiver 400 by the networking functionality 315, via the Ethernet port 320 of the IP switch 300. For instance, the video receiver 400 is an equipment comprising a screen 410 for displaying the video stream 111. The video stream 111 may be transmitted to several video receivers 400, for instance via a multicast IP flow as is well known in the art.

Another exemplary configuration (not represented in FIG. 11) corresponds to the configuration represented in FIG. 7B. The source video IP flow 101 is received from the cloud video server 200 via a front connector (e.g. 20) of the SFP unit 100. The video stream 111 is also outputted via a front connector (e.g. 21) of the SFP unit 100 for transmission to the video receiver 400.

Still another exemplary configuration (not represented in FIG. 11) corresponds to the configuration represented in FIG. 8A. The source video IP flow 101 is received from the cloud video server 200 via the Ethernet port 320 of the IP switch 300, and forwarded by the networking functionality 315 to the SFP unit 100 via its host interface 17. The video stream 111 is outputted via the host interface 17 of the SFP unit 100, and forwarded to the video receiver 400 by the networking functionality 315 via the Ethernet port 320 of the IP switch 300.

Yet another exemplary configuration (not represented in FIG. 11) corresponds to the configuration represented in FIG. 8B. The source video IP flow 101 is received from the cloud video server 200 via the Ethernet port 320 of the IP switch 300, and forwarded by the networking functionality 315 to the SFP unit 100 via its host interface 17. The video stream 111 is outputted via a front connector (e.g. 20) of the SFP unit 100 for transmission to the video receiver 400.

In some of the aforementioned configurations, the SFP unit 100 is only physically connected to the IP switch 300 via its host interface 17, but does not exchange data with the networking functionality 315 of the IP switch 300 (at least with respect to the execution of the cloud gateway functionality by the SFP unit 100). The exchange of data with the cloud video server 200 and the video receiver 400 is performed via one or more front connector(s) of the SFP unit 100.

In some of the aforementioned configurations, the SFP unit 100 only exchanges data (at least with respect to the execution of the cloud gateway functionality by the SFP unit 100) with the networking functionality 315 of the IP switch 300 via its host interface 17. There is no exchange of data via the front connector(s) of the SFP unit 100 (at least with respect to the execution of the cloud gateway functionality by the SFP unit 100); and the SFP unit may have no front connector at all.

The IP switch 300 is capable of performing layer 3 and/or layer 2 forwarding of IP packets, as is well known in the art. The term IP switch is used generically, and may encompass switches, routers, etc. A router generally has more sophisticated routing capabilities than a switch.

However, the IP switch 300 is a highly specialized equipment, optimized for performing switching and/or routing of IP packets in a very effective manner. Therefore, the IP switch 300 generally does not have the native conversion functionality 156, and may also lack the HTTP client functionality 152, implemented by the SFP unit 100. The software of the IP switch 300 may be upgraded to implement at least some of these functionalities, at the risk of downgrading the performances of its switching and/or routing functionalities, and at a potentially prohibitive cost. Therefore, the use of the SFP unit 100 is a simple, cost effective way to upgrade the IP switch 300 to support the previously described cloud gateway functionality, without downgrading the intrinsic capabilities of the IP switch 300.

Reference is now made concurrently to FIGS. 7A, 12A, 12B, 12C, 13A and 13B. FIGS. 12A-C and 13A-B represent a standardized hot-pluggable transceiving unit 500 providing an upstream cloud gateway functionality. As mentioned previously, for illustration purposes, the standardized hot-pluggable transceiving unit consists of a SFP unit; but other types of standardized hot-pluggable transceiving units may be used for implementing the system.

The SFP unit 500 corresponds to the SFP unit 100 represented in FIG. 7A, and comprises the housing 12, the back panel 16 and the front panel 18. However, the SFP unit 500 provides an upstream cloud gateway functionality while the SFP unit 100 represented in FIG. 7A provides a downstream cloud gateway functionality.

The SFP unit 500 comprises a first connector for receiving a source video stream 501. Various types of video streams 501 can be received by the SFP unit 500 based on its specific capabilities and characteristics, as will be illustrated later in the description. The SFP unit comprises a second connector for outputting a video IP flow 511 generated based on a processing by the SFP unit 500 of the source video stream 501. The video IP flow 511 is transmitted to the cloud video server 200. The first and second connectors can be different connectors, or the same connector.

Figure 12A:
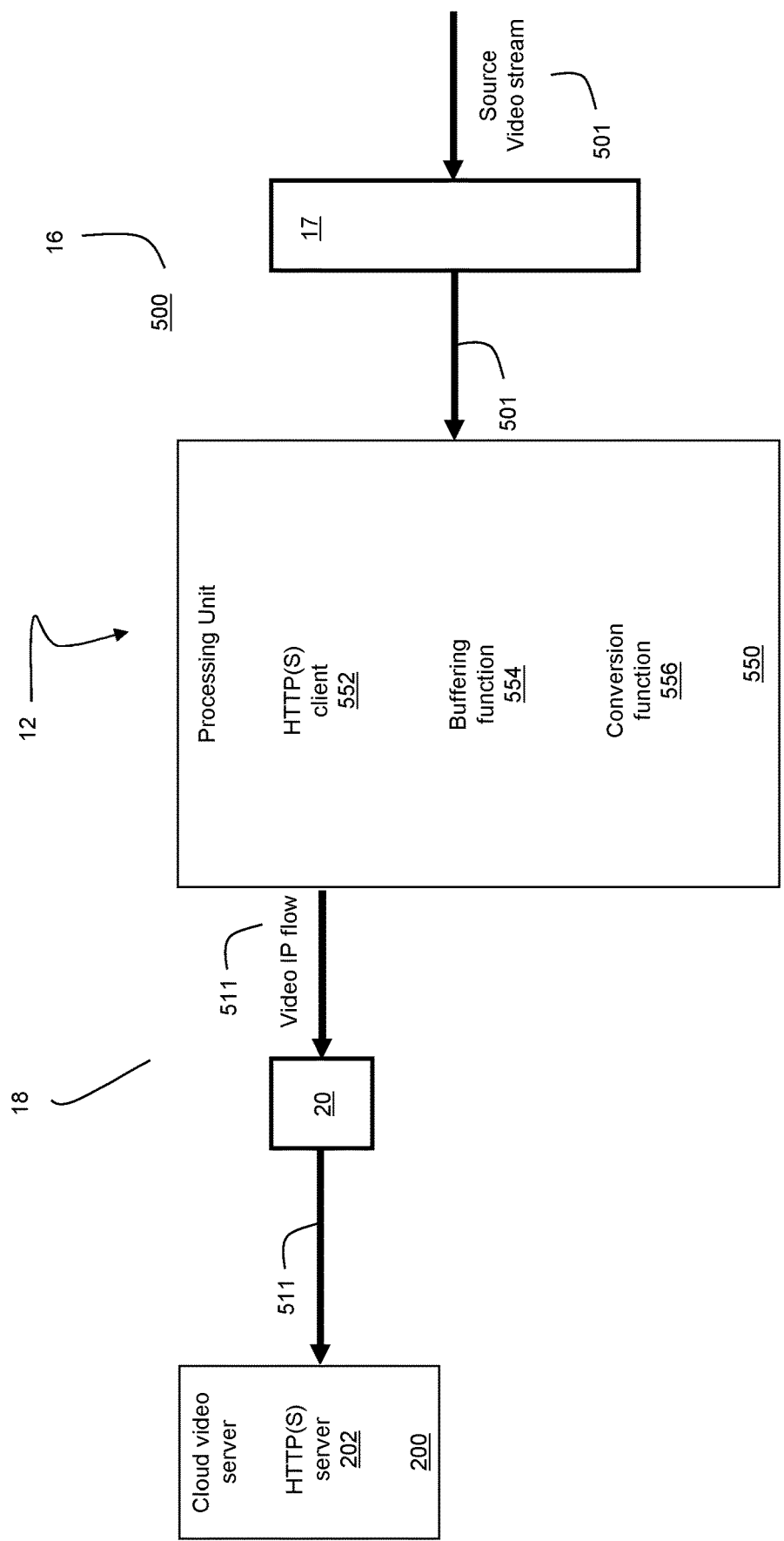
FIGS. 12A, 12B, 12C, 13A and 13B represent several configurations of a SFP unit executing a HTTP client and providing an upstream cloud gateway functionality.

In a first configuration illustrated in FIG. 12A, the first connector receiving the source video stream 501 is a host interface 17 located on the back panel 16 of the housing 12 of the SFP unit 100. The second connector outputting the video IP flow 511 is a front connector 20 located on the front panel 18 of the housing 12. The SFP unit 500 may include additional front connectors located on the front panel 18 of the housing 12 (not represented in FIG. 12A for simplification purposes). For example, the SFP unit 500 has four front connectors (Quad SFP) of electrical or optical type with an aggregate bandwidth of at least 40 Gbps. More than one front connector can be used for outputting a plurality of video IP flows 511 generated based on the processing by the SFP unit 500 of a corresponding plurality of source video streams 501 received via the host interface 17.

Figure 12B:
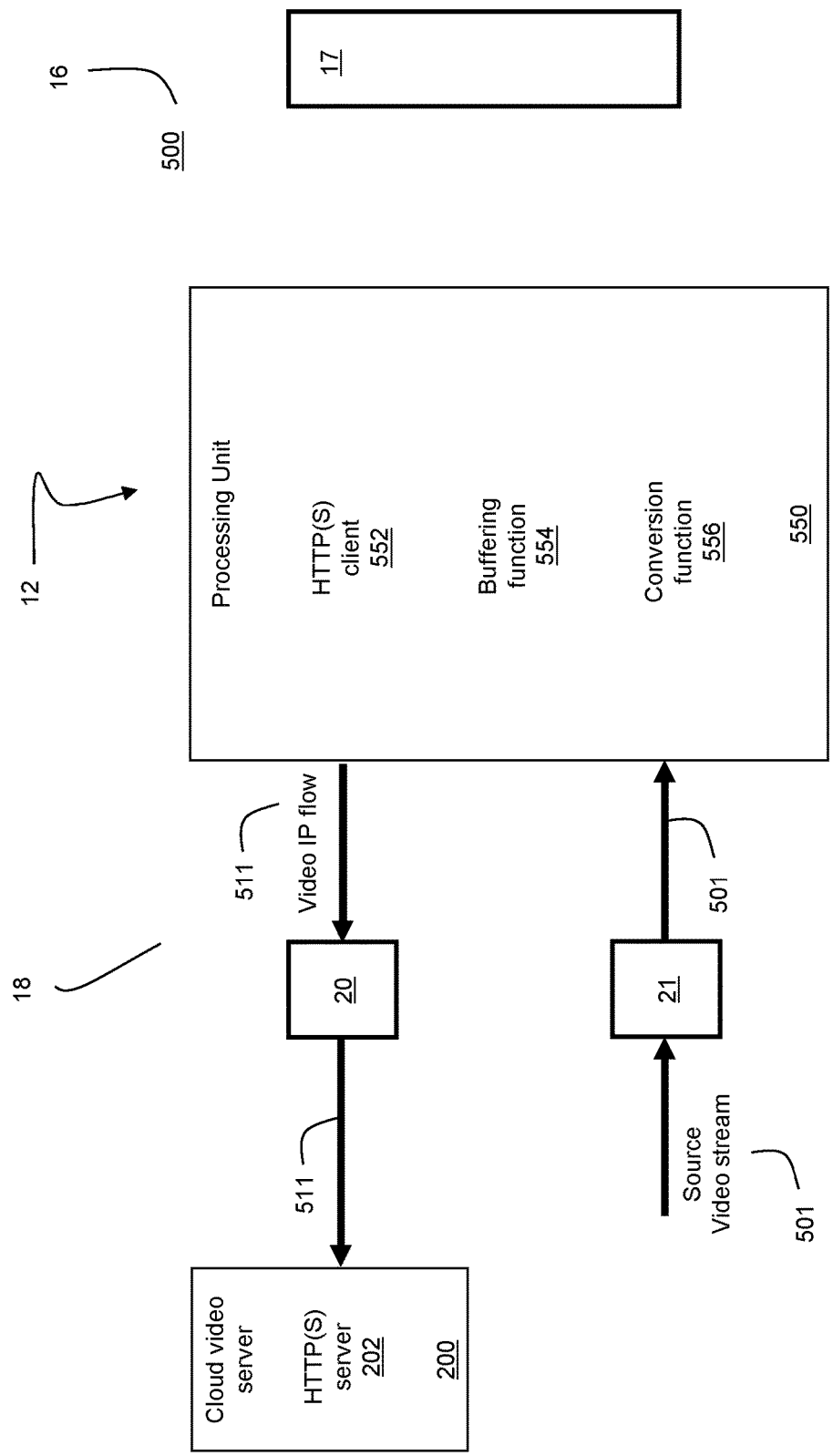

In a second configuration illustrated in FIG. 12B, the first connector receiving the source video stream 501 is a front connector 21 located on the front panel 18 of the housing 12. The second connector outputting the video IP flow 511 is another front connector 20 located on the front panel 18 of the housing 12. The SFP unit 500 may include additional front connectors located on the front panel 18 of the housing 12 (not represented in FIG. 12B for simplification purposes). More than one front connector can be used for receiving a plurality of source video streams 501 processed by the SFP unit 500 for generating a corresponding plurality of video IP flows 511, and more than one front connector can be used for outputting the corresponding plurality of video IP flows 511.

Figure 12C:
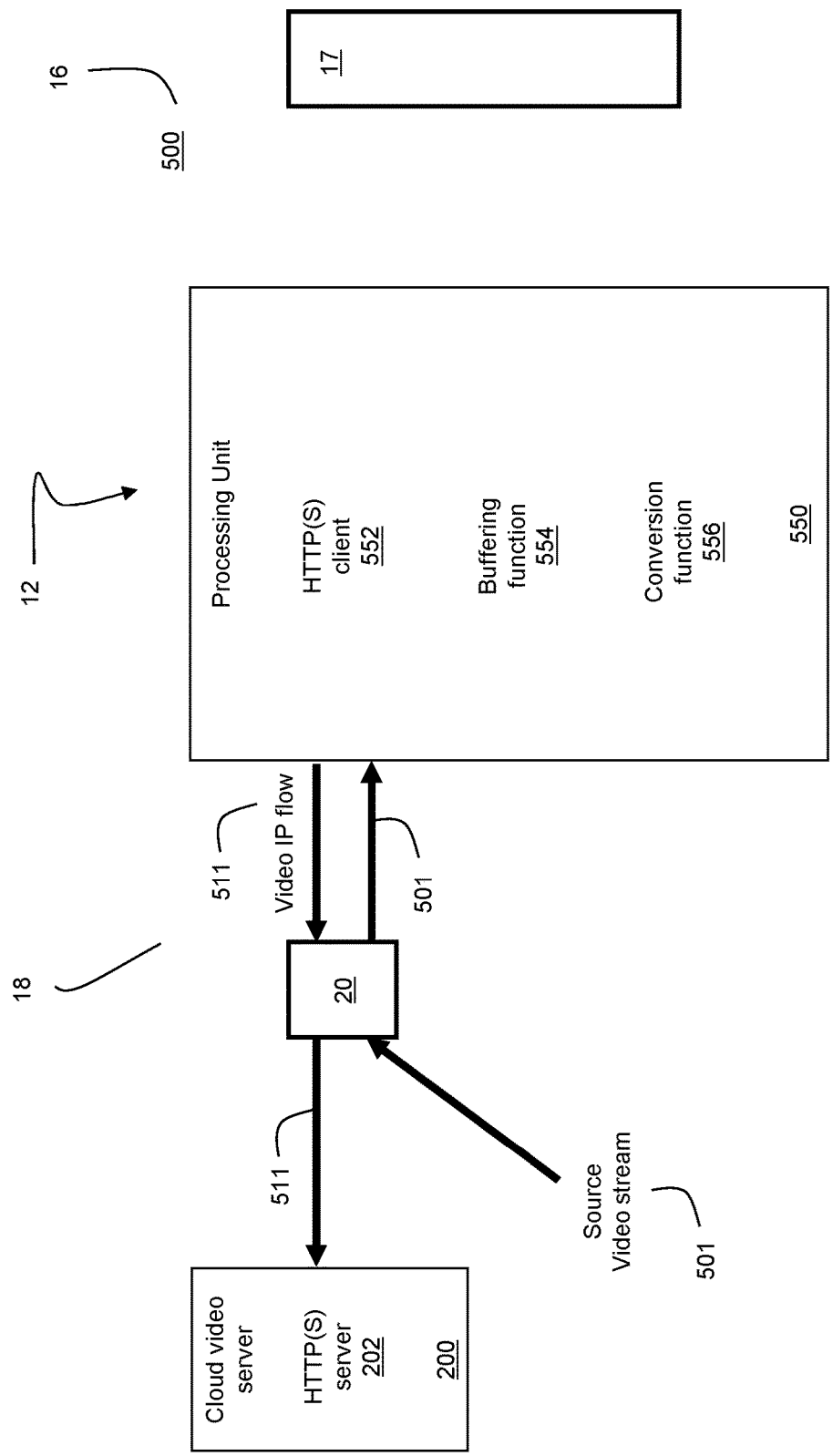

In a third configuration illustrated in FIG. 12C, the first connector receiving the source video stream 501 is the front connector 20 located on the front panel 18 of the housing 12. The second connector outputting the video IP flow 511 is the same front connector 20 which received the source video stream 501. The SFP unit 500 may include additional front connectors located on the front panel 18 of the housing 12 (not represented in FIG. 12C for simplification purposes). More than one front connector can be used for receiving a plurality of source video streams 501 processed by the SFP unit 500 for generating a corresponding plurality of video IP flows 511, and outputting the corresponding plurality of video IP flows 511.

Figure 13A:
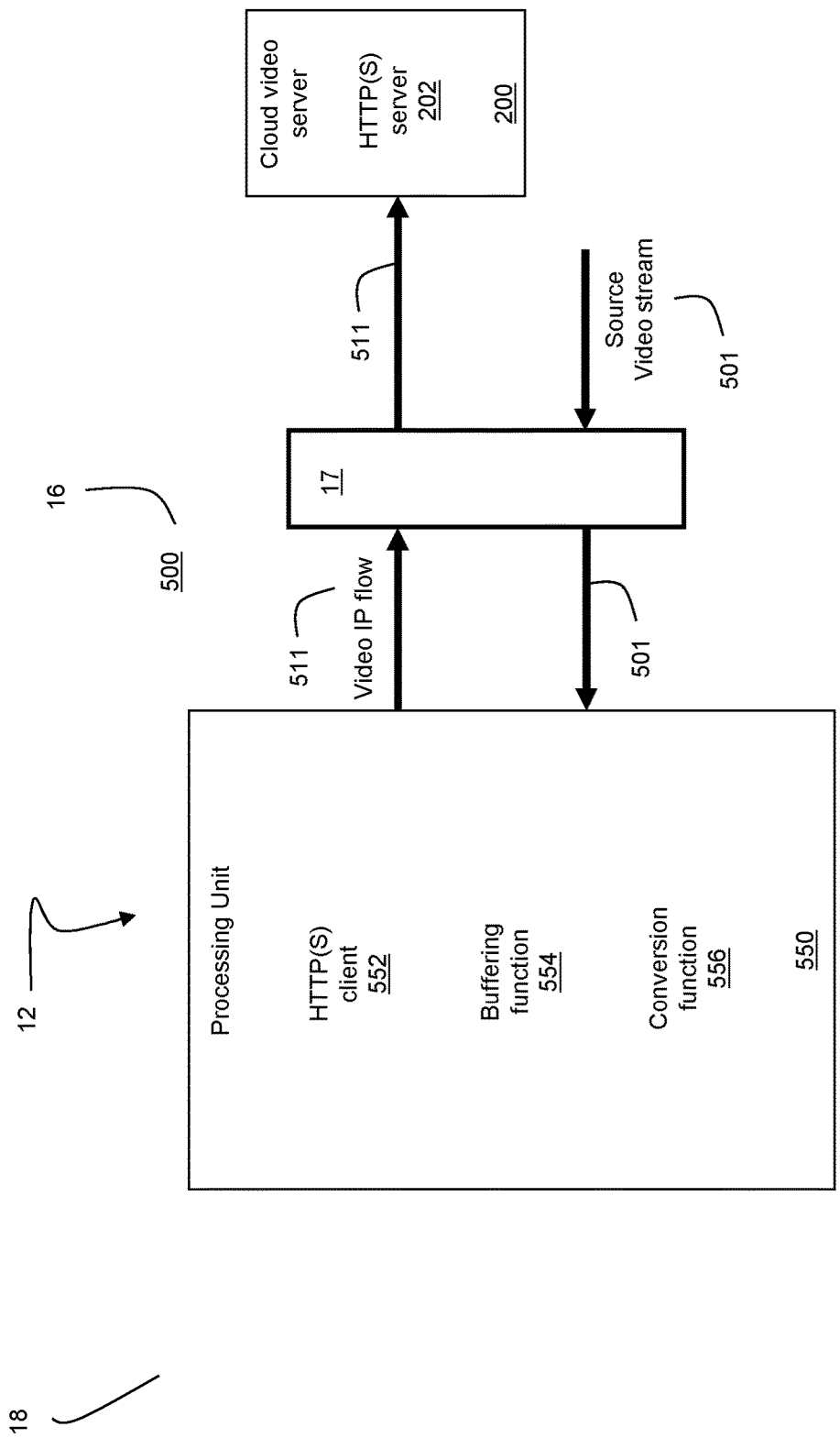

In a fourth configuration illustrated in FIG. 13A, the first connector receiving the source video stream 501 is the host interface 17 located on the back panel 16 of the housing. The second connector outputting the video IP flow 511 is also the host interface 17 located on the back panel 16 of the housing 12. In this configuration, the SFP unit 500 does not have any front connector located on the front panel 18 of the housing 12. Alternatively, the SFP unit 500 has at least one front connector (not represented in FIG. 13A) located on the front panel 18 of the housing 12, which can be used for other purposes than the cloud gateway functionality implemented by the SFP unit 500.

Figure 13B:
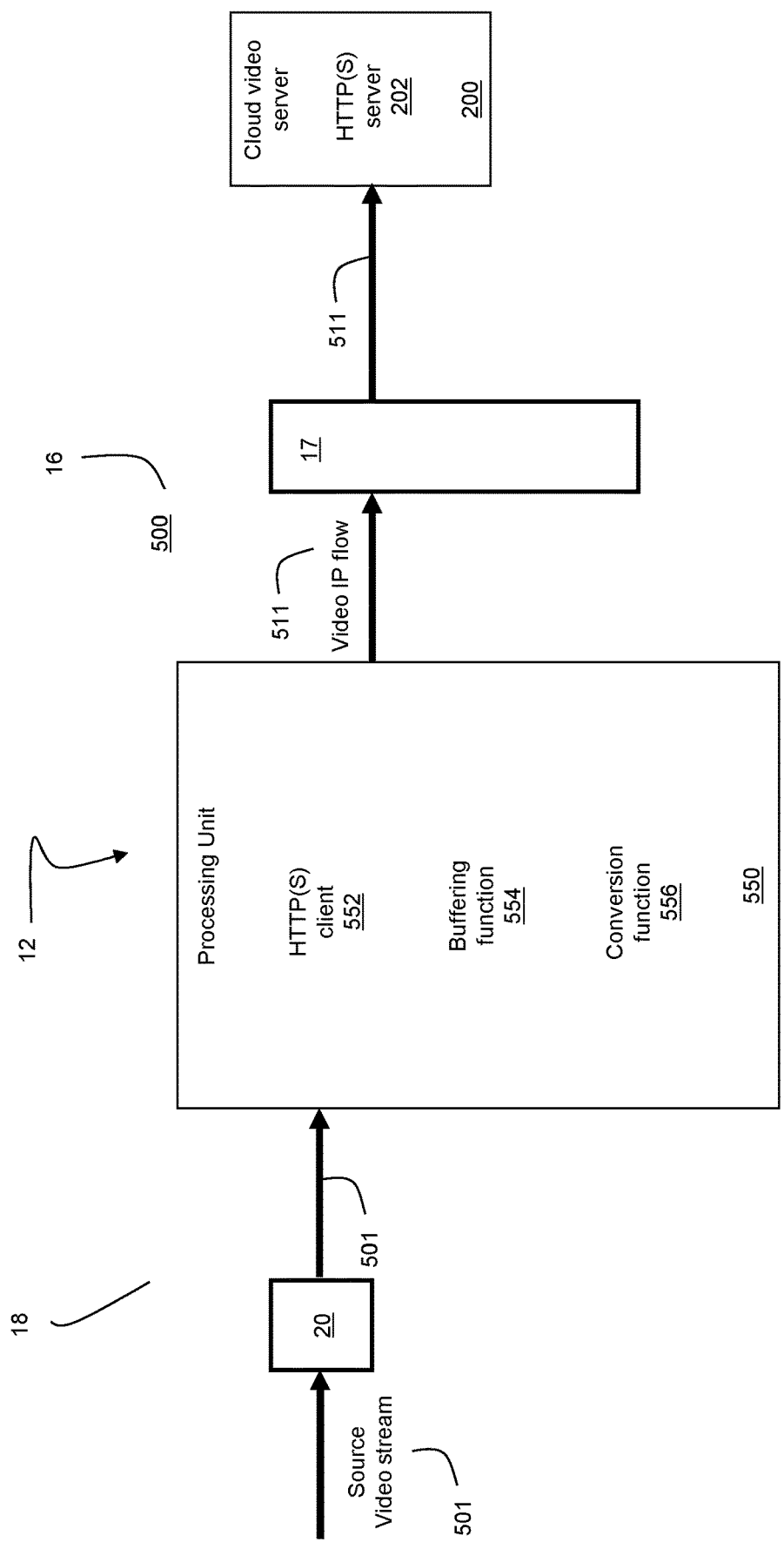

In a fifth configuration illustrated in FIG. 13B, the first connector receiving the source video stream 501 is the front connector 20 located on the front panel 18 of the housing 12. The second connector outputting the video IP flow 511 is the host interface 17 located on the back panel 16 of the housing 12. The SFP unit 500 may include additional front connectors located on the front panel 18 of the housing 12 (not represented in FIG. 13B for simplification purposes). More than one front connector can be used for receiving a plurality of source video streams 511 processed by the SFP unit 500 for generating a corresponding plurality of video IP flows 511, the corresponding plurality of video IP flows 511 being outputted via the host interface 17.

The SFP unit 500 comprises at least one processing unit 550 for executing several functions implementing the upstream cloud gateway functionality. A single processing unit 550 is represented in the Figures for executing the functions (e.g. a Hypertext Transfer Protocol (HTTP) client 552 and a conversion function 556) implementing the upstream cloud gateway functionality. However, the SFP unit 500 may include several processing units 550, and the functions implementing the cloud gateway functionality may be spread across the several processing units 550 (e.g. the HTTP client 552 is executed by a first processing unit 550, and the conversion function 556 is executed by a second processing unit 550). The processing unit 550 includes one or more processor, memory, and optionally hardware components having dedicated signal processing capabilities.

As mentioned previously with respect to the HTTP client 152, in the rest of the description, when referring to the HTTP client 552, it is implied that the HTTP client 552 supports any one of the HTTP or HTTPS protocols.

Other functionalities related to the processing of the signals (e.g. electrical or optical signals, analog or digital signals, etc.) received and outputted by the SFP unit 500 via the front connector(s) 20/21 and the host interface 17 may include an optical to electrical conversion functionality, an electrical to optical conversion functionality, a Digital to Analog Converter (DAC) functionality, an Analog to Digital Converter (ADC) functionality, a serializing functionality, a de-serializing functionality, a re-clocking functionality, etc. Although not represented in the Figures for simplification purposes, at least some of these functionalities are implemented by the SFP unit 500 as is well known in the art. These functionalities are implemented by dedicated signal processing unit(s) not represented in the Figures for simplification purposes, by the at least one processing unit 550, or by a combination of these.

The processing unit 550 executes the conversion function 556 for generating the video IP flow 511 based on the source video stream 501. The conversion performed by the conversion function 556 depends on the type of received video stream 511, and on the type of video payloads transported by the generated video IP flow 501.

In a first configuration, the source video stream 511 is a SDI video signal received via a SDI connector (e.g. SDI front connector 21 in FIG. 12B, SDI front connector 20 in FIG. 13B) on the front panel 18 of the SFP unit 500.

Source SDI video payloads are transported in the SDI video signal 501 received via the SDI front connector. If the outgoing video IP flow 511 simply transports the source SDI video payloads over the TCP and HTTP (or HTTPS) protocols, the conversion function 556 performs no video format conversion, and only controls the generation of the outgoing video IP flow 511.

If the outgoing video IP flow 511 transports outgoing video payloads different from the SDI type (e.g. H264 video payloads) over the TCP and HTTP (or HTTPS) protocols, the conversion function 556 converts the source SDI video payloads of the source video stream 501 received via the SDI front connector into the outgoing video payloads (e.g. H264 video payloads) transported in the outgoing video IP flow 511.

In a second configuration, the source video stream 511 is a HDMI video signal received via a HDMI connector (e.g. HDMI front connector 21 in FIG. 12B, HDMI front connector 20 in FIG. 13B) on the front panel 18 of the SFP unit 500.

Source HDMI video payloads are transported in the HDMI video signal 501 received via the HDMI front connector. If the outgoing video IP flow 501 simply transports the source HDMI video payloads over the TCP and HTTP (or HTTPS) protocols, the conversion function 556 performs no video format conversion, and only controls the generation of the outgoing video IP flow 511.

If the outgoing video IP flow 511 transports outgoing video payloads different from the HDMI type (e.g. H264 video payloads or SDI video payloads) over the TCP and HTTP (or HTTPS) protocols, the conversion function 556 converts the source HDMI video payloads of the source video stream 501 111 received via the HDMI front connector into the outgoing video payloads (e.g. H264 video payloads or SDI video payloads) transported in the outgoing video IP flow 511.

In a third configuration, the source video stream 501 is also a video IP flow (referred to as the source video IP flow 501), but with characteristics different from the outgoing video IP flow 511. The first connector for receiving the source video IP flow 5011 is adapted for receiving IP packets. The first connector is the host interface 17, as illustrated in FIGS. 12A and 13A. Alternatively, the first connector is a front connector, as illustrated in FIGS. 12B (front connector 21), 12C (front connector 20) and 13B (front connector 20).

For instance, the source video IP flow 501 uses the UDP protocol. The SFP unit 500 provides a UDP to TCP conversion function (implemented by the conversion function 556) for transporting video over IP. The RTP protocol can be used on top of the UDP protocol for transporting the video payloads of the source video IP flow 501. Thus, the SFP unit 500 may provide various types of IP protocols conversion functions, such as UDP to TCP/HTTP, UDP to TCP/HTTPS, UDP/RTP to TCP/HTTP, UDP/RTP to TCP/HTTPS, etc. Each video payload transported by the source video IP flow 501 is simply transported by the corresponding outgoing video IP flow 511. Alternatively, several video payloads transported by the source video IP flow 501 are combined into a single video payload transported by the corresponding outgoing video IP flow 511. In still another alternative, each video payload transported by the source video IP flow 501 is split into a plurality of video payloads transported by the corresponding outgoing video IP flow 511.

The same type of video payloads can be transported by the source video IP flow 501 and the outgoing video IP flow 511. The conversion function 556 performs no video format conversion, and only controls the generation of the outgoing video IP flow 511. Alternatively, the conversion function 556 also converts a first type of video payloads transported by the source video IP flow 501 into a second type of video payloads transported by the outgoing video IP flow 511.

For example, the source video IP flow 501 transports H264 video payloads over the UDP protocol, and the outgoing video IP flow 511 transports the H264 video payloads over the TCP and HTTP (or HTTPS) protocols. Alternatively, the conversion function 556 converts the H264 video payloads of the source video IP flow 501 into another type of video payloads (e.g. SDI video payloads) transported by the outgoing video IP flow 511.

In another example, the source video IP flow 501 transports SDI video payloads over the UDP protocol, and the outgoing video IP flow 511 transports the SDI video payloads over the TCP and HTTP (or HTTPS) protocols. Alternatively, the conversion function 556 converts the SDI video payloads of the source video IP flow 501 into another type of video payloads (e.g. H264 video payloads) transported by the outgoing video IP flow 511.

In a particular aspect, the outgoing video IP flow 511 conforms to one of the following standards: the SMPTE2022-5 standard, the SMPTE2022-6 standard, and the SMPTE2022-7 standard, the SMPTE2110 standard (such as SMPTE2110-10, SMPTE2110-20, SMPTE2110-21, SMPTE2110-30, SMPTE 2110-40, SMPTE2110-50, etc.). In some cases, the outgoing video IP flow 111 conforms to a combination of one of the SMPTE2022 standard family and one of the SMPTE2110 standard family.

The processing unit 550 executes the HTTP client 552, and the cloud video server 200 executes the HTTP server 202. The HTTP server 202 generally provides access to video data stored at the cloud video server 200. However, in the present configuration, the HTTP client 552 is used to upload video data on the HTTP server 202. The uploaded video data can then be used by any computing device capable of downloading the uploaded video data using the HTTP and/or HTTPS protocols. The HTTP client 552 first establishes a connection with the HTTP server 202. Then, the HTTP client 552 uploads the video IP flow 511 from on HTTP server 202.

The first step consisting in establishing a connection between the HTTP client 552 and the HTTP server 202 has already been described previously, and is similar when performing a "download from" or an "upload to" the HTTP server 202. As mentioned previously, during the first step, the HTTP client 552 may be required to provide credentials to the HTTP server 202, in order to gain access to the HTTP server 202. During the first step, the HTTP client 552 may also provide an identification of the video data uploaded to the HTTP server 202.

The second step consisting in transmitting the video data from the HTTP client 552 to the HTTP server 202 is well known in the art. The video IP flow 511 transports the video data via the HTTP (or HTTPS) connection established between the HTTP client 552 and the HTTP server 202 at the first step. One of the HTTP or the HTTPS protocol is used by the video IP flow 511. Video payloads comprising the video data uploaded by the HTTP client 552 for being hosted by the HTTP server 202 are transported by the video IP flow 511.

As mentioned previously, the video IP flow 511 is outputted via the first connector (e.g. front connector 20 in FIGS. 12A, 12B and 12C; host interface 17 in FIGS. 13A and 13B) of the SFP unit 500. The first step consisting in establishing the connection between the HTTP client 552 and the HTTP server 202 is also generally performed through the first connector, but may be performed via another connector supporting the exchange of IP packets.

Optionally, the processing unit 550 executes a buffering function 554 for buffering packets of the video IP flow 511 generated by the conversion function 556 based on the source video stream 501, before the packets are transmitted by the HTTP client 552.

Although the HTTP client 552, the optional buffering function 554 and the conversion function 556 are represented as separate functional entities in the Figures, at least some of the functions 552, 554 and 556 may be integrated. For example, the optional buffering function 554 and the conversion function 556 are implement as plug-in software modules of a main software program implementing a standard HTTP client functionality 552.

The level of integration between the conversion function 556 and the HTTP client 552 may vary from one implementation to another. For example, the conversion function 556 extracts the source video payloads from the source video stream 501, optionally converts the source video payloads; and the HTTP client 552 generates the video IP flow 511 comprising HTTP (or HTTPS) payloads based on the extracted (and optionally converted) source video payloads. In another example, the conversion function 556 extracts the source video payloads from the source video stream 501, optionally converts the source video payloads, generates HTTP (or HTTPS) payloads of the video IP flow 511 based on the extracted (and optionally converted) source video payloads; and the HTTP client 552 simply transmits the HTTP (or HTTPS) payloads of the video IP flow 511.

Figure 14:
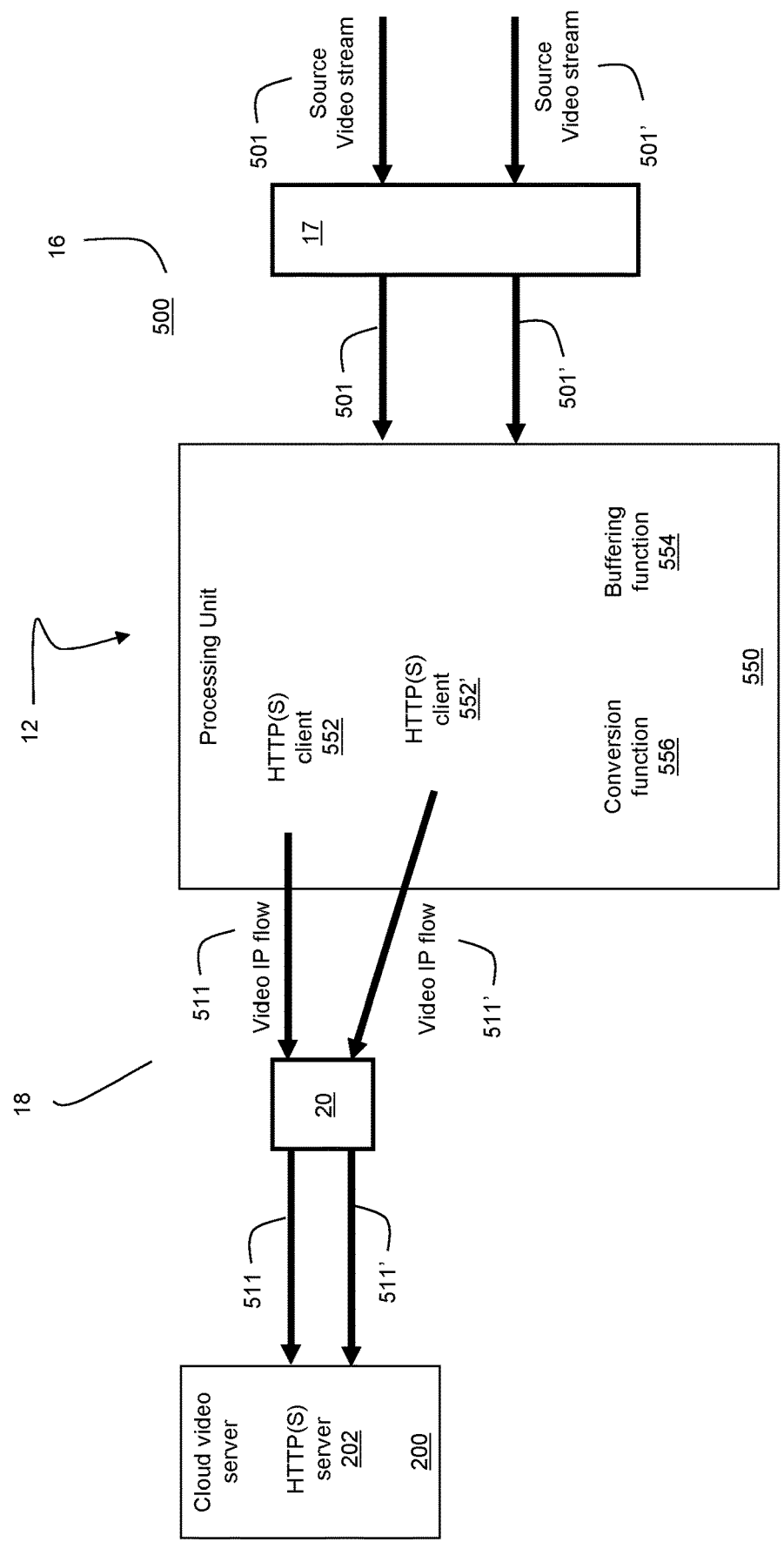
FIGS. 14 and 15 represent several configurations of a SFP unit executing a plurality of HTTP clients and providing an upstream cloud gateway functionality.
Figure 15:
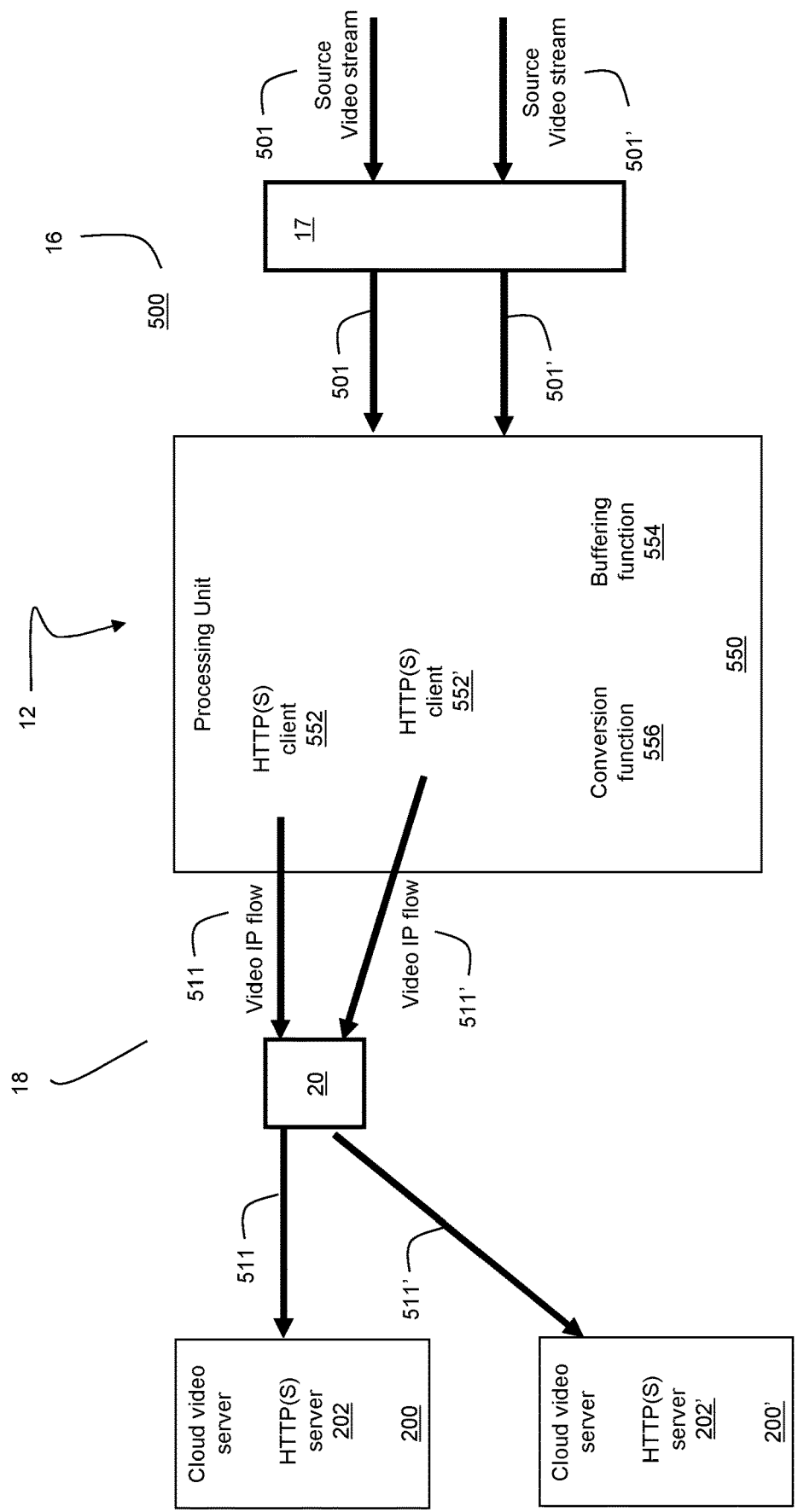

Reference is now made concurrently to FIGS. 14 and 15, where a plurality of HTTP clients (e.g. 552 and 552') are executed by the processing unit 550. Only two HTTP clients 552 and 552' are represented in FIGS. 14 and 15 for simplification purposes. However, a larger number of HTTP clients may be executed in parallel. Furthermore, FIGS. 14 and 15 represent all the HTTP clients (e.g. 552 and 552') being executed by the same processing unit 550. However, the execution of the HTTP clients may be spread across a plurality of processing units 550 of the SFP unit 500.

Furthermore, although not represented in the Figures for simplification purposes, a plurality of conversion functions 556 may also be executed in parallel, either by a single processing unit 550, or spread across a plurality of processing units 550. A given conversion function 556 is dedicated to one or more given HTTP clients 552. Alternatively, each conversion function 556 is capable of processing video payloads received by any of the HTTP clients 552.

Reference is now made more particularly to FIG. 14. The plurality of HTTP clients (e.g. 552 and 552') establishes a corresponding plurality of connections with the HTTP server 202 hosted by the cloud video server 200. The plurality of HTTP clients (e.g. 552 and 552') transmits a corresponding plurality of video IP flows (e.g. 511 and 511') to the HTTP server 202 via the second connector (e.g. front connector 20 in FIG. 14) of the SFP unit 500. The plurality of video IP flows (e.g. 511 and 511') uses one of the HTTP or the HTTPS protocol for transporting their video payloads from the SFP unit 500 to the cloud video server 200. The conversion function 556 generates the plurality of video IP flows (e.g. 511 and 511') based on a corresponding plurality of source video streams (e.g. 501 and 501') received via the first connector (e.g. host interface 17 in FIG. 14) of the SFP unit 500. For example, the video IP flow 511 is generated based on the source video stream 501 and the video IP flow 511' is generated based on the source video stream 501'.

FIG. 14 represents the plurality of video IP flows (e.g. 511 and 511') generated by the conversion function 556 being outputted via the same connector (e.g. front connector 20 in FIG. 14). However, the plurality of video IP flows (e.g. 511 and 511') generated by the conversion function 556 may be outputted via different connectors of the SFP unit 500. Similarly, FIG. 14 represents the plurality of source video streams (e.g. 501 and 501') being received via the same connector (e.g. the host interface 17 in FIG. 14). However, the plurality of source video streams (e.g. 501 and 501') may be received via different connectors of the SFP unit 500.

Furthermore, at least one of the HTTP clients (e.g. 552) may be transmitting a plurality of video IP flows (e.g. 511) simultaneously to the HTTP server 202.

Reference is now made more particularly to FIG. 15. The plurality of HTTP clients (e.g. 552 and 552') establishes a corresponding plurality of connections with respectively one among several HTTP servers (e.g. 202 and 202') respectively hosted by several cloud video servers (e.g. 200 and 200'). The plurality of HTTP clients (e.g. 552 and 552') transmits a corresponding plurality of video IP flows (e.g. 511 and 511') to the HTTP servers (e.g. 202 and 202') via the second connector (e.g. front connector 20 in FIG. 15) of the SFP unit 500. The plurality of video IP flows (e.g. 511 and 511') uses one of the HTTP or the HTTPS protocol for transporting their video payloads from the SFP unit 500 to the cloud video servers (e.g. 200 and 200'). The conversion function 556 generates the plurality of video IP flows (e.g. 511 and 511') based on a corresponding plurality of source video streams (e.g. 501 and 501') received via the first connector (e.g. host interface 17 in FIG. 15) of the SFP unit 500. For example, the video IP flow 511 transmitted to the cloud video server 200 is generated based on the source video stream 501, and the video IP flow 511' transmitted to the cloud video server 200' is generated based on the source video stream 501'. Only two cloud video servers 200 and 200' have been represented in FIG. 15 for simplification purposes. However, more than two cloud video servers may be receiving video IP flows from the SFP unit 500.

FIG. 15 represents the plurality of video IP flows (e.g. 511 and 511') generated by the conversion function 556 being outputted via the same connector (e.g. the front connector 20 in FIG. 15). However, the plurality of video IP flows (e.g. 511 and 511') generated by the conversion function 556 may be outputted via different connectors of the SFP unit 500. Similarly, FIG. 15 represents the plurality of source video streams (e.g. 501 and 501') being received via the same connector (e.g. the host interface 17 in FIG. 15). However, the plurality of source video streams (e.g. 501 and 501') may be received via different connectors of the SFP unit 500.

Furthermore, at least one of the HTTP clients (e.g. 552) may be transmitting a plurality of video IP flows (e.g. 511) simultaneously to the same HTTP server (e.g. 202) hosted by one of the cloud video servers (e.g. 200). Alternatively, each one of the plurality of HTTP clients (e.g. 552) is dedicated to the transmission of a single video IP flow (e.g. 511) to one of the HTTP servers (e.g. 202).

Referring now to all of FIGS. 12A to 15 concurrently, a mechanism for remotely controlling the operations of the SFP unit 500 will be described.

The SFP unit 500 receives a control message from a third-party computing device (not represented in the Figures). The control message comprises one or more parameters for controlling the operations of the HTTP client 552. For example, the control message comprises an identification of the HTTP server 202 hosted by the cloud video server 200 (e.g. an IP address, a Uniform Resource Locator (URL), etc.), credentials for obtaining access to the HTTP server 202, etc. Alternatively or complementarity, the control message comprises one or more parameters for controlling the operations of the conversion function 556. For example, the control message comprises parameter(s) defining how the source video payloads of the source video stream 501 are processed to generate the outgoing video payloads of the outgoing video IP flow 511 (e.g. applying a scaling ratio, identifying several source video payloads corresponding to several source video stream 501 to be combined in outgoing video payloads transported by a single outgoing video IP flow 511, etc.).

The third-party computing device for controlling the operations of the SFP unit 500 includes a user interface, allowing a user to enter user commands. The user commands are processed by the third-party computing device to generate the control message transmitted to the SFP unit 500. The control message can be transported via the IP protocol. Upon reception of the control message (e.g. via the host interface 17 or via a front connector (e.g. 20 or 21) of the SFP unit 500), the processing unit 550 interprets the received control message, and controls the operations of the SFP unit 500 accordingly. The control message may be compliant with a standardized Control Plane Signaling protocol, such as SNMP, OpenFlow, IGMP, etc. Alternatively, the control message is compliant with a proprietary Control Plane Signaling protocol.

As mentioned previously, additional data (e.g. audio payloads, metadata payloads, a combination thereof, etc.) may be transported by the source video stream 501. The additional data are either included in the video payloads transported by the source video stream 501, or the additional data are transported in dedicated payloads independent from the video payloads. The processing of the additional data by the conversion function 556 depends on the type of video IP flow 511 generated by the conversion function 556. For example, the additional data are included in the source video payloads transported by the source video stream 501, and the conversion function 556 includes the additional data in the outgoing video payloads transported by the outgoing video IP flow 511. Alternatively, the additional data are included in the source video payloads transported by the source video stream 501, and the conversion function 556 generates dedicated outgoing payloads comprising the additional data and transported by the outgoing video IP flow 511.

Figure 16:
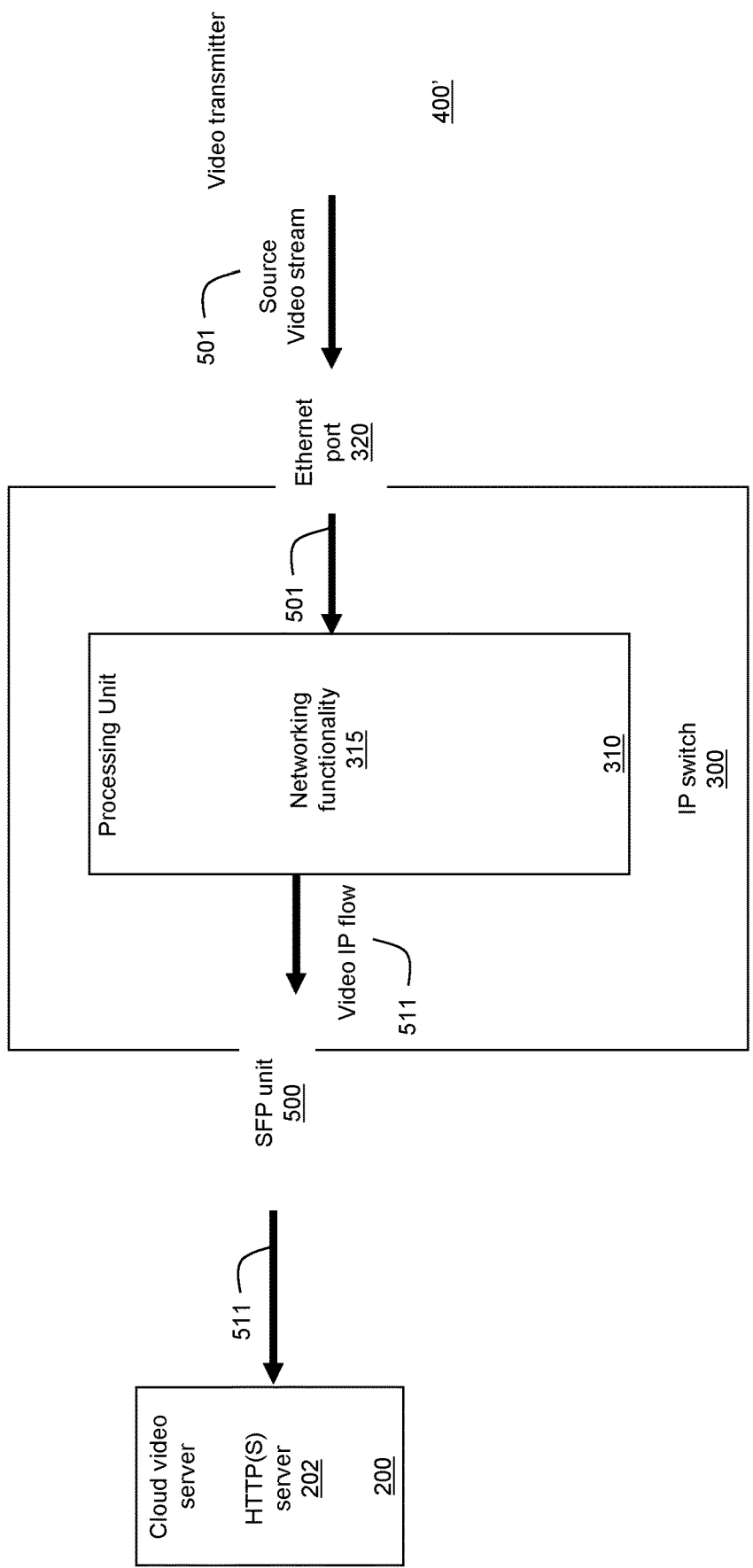
FIG. 16 illustrates an exemplary use case for the usage of the SFP units represented in FIGS. 12A, 14 and 15.

Reference is now made concurrently to FIGS. 12A and 16; where FIG. 16 represents an exemplary use case for the usage of the system described in the present disclosure for providing an upstream cloud gateway functionality. For illustration purposes, this exemplary use case corresponds to the system described in relation to FIG. 12A. However, a person skilled in the art could easily adapt it to the system described in relation to FIGS. 12B to 15. The IP switch 300 represented in FIG. 16 corresponds to the IP switch 300 represented in FIG. 11.

The SFP unit 500 is inserted in the chassis of the IP switch 300. A single SFP unit 500 is represented in FIG. 16 for simplification purposes, but a plurality of SFP units 500 respectively implementing a cloud gateway functionality may be inserted simultaneously in the chassis of the IP switch 300.

The exemplary configuration represented in FIG. 16 corresponds to the configuration represented in FIG. 12A. The IP switch 300 includes the Ethernet port 320 for receiving the source video stream 501 generated by a video transmitter 400'. The source video stream 501 is transmitted by the networking functionality 315 executed by the processing unit 310 of the IP switch 300 to the SFP unit 500 via the host interface 17 of the SFP unit 500. The video IP flow 511 generated by the SFP unit 500 based on the source video stream 501 is transmitted to the cloud video server 200 via a front connector (e.g. 20) of the SFP unit 500.

Another exemplary configuration (not represented in FIG. 16) corresponds to the configuration represented in FIG. 12B. The source video stream 501 is received from the video transmitter 400' via a front connector (e.g. 21) of the SFP unit 500. The video IP flow 511 generated by the SFP unit 500 based on the source video stream 501 is also outputted via a front connector (e.g. 20) of the SFP unit 500 for transmission to the cloud video server 200.

Still another exemplary configuration (not represented in FIG. 16) corresponds to the configuration represented in FIG. 13A. The source video stream 501 is received from the video transmitter 400' via the Ethernet port 320 of the IP switch 300, and forwarded by the networking functionality 315 to the SFP unit 500 via its host interface 17. The video IP flow 511 generated by the SFP unit 500 based on the source video stream 501 is outputted via the host interface 17 of the SFP unit 500, and forwarded to the cloud video server 200 by the networking functionality 315 via the Ethernet port 320 of the IP switch 100.

Yet another exemplary configuration (not represented in FIG. 16) corresponds to the configuration represented in FIG. 13B. The source video stream 501 is received via a front connector (e.g. 20) of the SFP unit 500 from the video transmitter 400'. The video IP flow 511 generated by the SFP unit 500 based on the source video stream 501 is transmitted to the networking functionality 315 by the SFP unit 500 via its host interface 17, and forwarded to the cloud video server 200 via the Ethernet port 320 of the IP switch 300.

In some of the aforementioned configurations, the SFP unit 500 is only physically connected to the IP switch 300 via its host interface 17, but does not exchange data with the networking functionality 315 of the IP switch 300 (at least with respect to the execution of the cloud gateway functionality by the SFP unit 500). The exchange of data with the cloud video server 200 and the video transmitter 400' is performed via one or more front connector(s) of the SFP unit 500.

In some of the aforementioned configurations, the SFP unit 500 only exchanges data (at least with respect to the execution of the cloud gateway functionality by the SFP unit 500) with the networking functionality 315 of the IP switch 300 via its host interface 17. There is no exchange of data via the front connector(s) of the SFP unit 500 (at least with respect to the execution of the cloud gateway functionality by the SFP unit 500); and the SFP unit may have no front connector at all.

Although not represented in the Figures for simplification purposes, the downstream cloud gateway functionality of the SFP unit 100 may be combined with the upstream cloud gateway functionality of the SFP unit 500 into a single SFP unit. The single SFP unit includes at least one HTTP client for exchanging video data (upstream and downstream) with the HTTP server 202, an optional buffering function, a downstream conversion function for converting a source video IP flow (received from the HTTP server 202) into an outgoing video stream, and an upstream conversion function for converting a received source video stream into an outgoing video IP flow (transmitted to the HTTP server 202).

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A standardized hot-pluggable transceiving unit comprising:
    a housing having standardized dimensions and adapted to being inserted into a chassis of a hosting unit;
    a first connector for receiving a first video Internet Protocol (IP) flow and transmitting a second video IP flow;
    a second connector for transmitting a first video stream and receiving a second video stream;
    at least one processing unit in the housing for:
        executing a first Hypertext Transfer Protocol (HTTP) client, the first HTTP client establishing a first connection with a HTTP server hosted by a cloud video server and receiving the first video IP flow from the HTTP server of the cloud video server via the first connector, the first video IP flow using one of the HTTP or the Hypertext Transfer Protocol Secure (HTTPS) protocol;
        executing a first conversion function, the first conversion function generating the first video stream based on the first video IP flow;
        executing a second conversion function, the second conversion function generating the second video Internet Protocol (IP) flow based on the second video stream; and
        executing a second Hypertext Transfer Protocol (HTTP) client, the second HTTP client establishing a second connection with the HTTP server hosted by the cloud video server and transmitting the second video IP flow to the HTTP server of the cloud video server via the first connector, the second video IP flow using one of the HTTP or the Hypertext Transfer Protocol Secure (HTTPS) protocol.

2. The transceiving unit of claim 1, wherein the first and second HTTP clients are the same HTTP client or the first and second HTTP clients are different HTTP clients.

3. The transceiving unit of claim 1, wherein the at least one processing unit further executes a buffering function for buffering video payloads transported by the received first video IP flow before they are processed by the first conversion function and buffering video payloads transported by the second video IP flow generated by the second conversion function.

4. The transceiving unit of claim 1, wherein the first connector is a front connector located on a front panel of the housing, and the second connector is one of the following: a host interface located on a back panel of the housing, the front connector, or another front connector located on the front panel of the housing.

5. The transceiving unit of claim 1, wherein the first connector is a host interface located on a back panel of the housing, and the second connector is one of the following: the host interface, or a front connector located on a front panel of the housing.

6. The transceiving unit of claim 1, wherein the first and second connectors consist of a single host interface located on a back panel of the housing, and the transceiving unit has no front connector located on a front panel of the housing.

7. The transceiving unit of claim 1, wherein the second connector is a Serial Digital Interface (SDI) connector located on a front panel of the housing, the first video stream generated by the first conversion function is an SDI video signal outputted by the SDI connector, and the second video stream is an SDI video signal received by the SDI connector.

8. The transceiving unit of claim 1, wherein the first conversion function converts the first video IP flow into the first video stream consisting of an outgoing video IP flow and the second video stream consists of an incoming video IP flow.

9. The transceiving unit of claim 8, wherein the outgoing video IP flow uses the User Datagram Protocol (UDP).

10. The transceiving unit of claim 9, wherein the outgoing video IP flow uses the Real-time Transport Protocol (RTP).

11. The transceiving unit of claim 8, wherein the outgoing video IP flow conforms to at least one of the following standards: the SMPTE 2022-5 standard, the SMPTE 2022-6 standard, the SMPTE 2022-7 standard, and one of the SMPTE 2110 standard family.

12. The transceiving unit of claim 8, wherein the incoming video IP flow uses the User Datagram Protocol (UDP).

13. The transceiving unit of claim 12, wherein the incoming video IP flow uses the Real-time Transport Protocol (RTP).

14. The transceiving unit of claim 8, wherein the incoming video IP flow conforms to at least one of the following standards: the SMPTE 2022-5 standard, the SMPTE 2022-6 standard, the SMPTE 2022-7 standard, and one of the SMPTE 2110 standard family.

15. A system comprising:
    a hosting unit comprising a chassis adapted for receiving at least one standardized hot-pluggable transceiving unit, the chassis comprising at least one processing unit capable of processing packets of an Internet Protocol (IP) flow; and
    the at least one standardized hot-pluggable transceiving unit inserted into the chassis, the at least one standardized hot-pluggable transceiving unit each comprising:
        a housing having standardized dimensions and adapted to being inserted into the chassis;
        a host interface on a back panel of the housing, the host interface being connected to the hosting unit;
        a first connector for receiving a source video IP flow;
        at least one processing unit in the housing for:

executing a Hypertext Transfer Protocol (HTTP) client, the HTTP client establishing a connection with a HTTP server hosted by a cloud video server and receiving the source video IP flow from the HTTP server of the cloud video server via the first connector, the source video IP flow using one of the HTTP or the Hypertext Transfer Protocol Secure (HTTPS) protocol; and executing a conversion function, the conversion function generating a video stream based on the source video IP flow; and a second connector for outputting the video stream;

wherein the first and second connectors of at least one of the at least one standardized hot-pluggable transceiving unit are respectively different from the host interface.

16. The system of claim 15, wherein the first and second connectors of the at least one standardized hot-pluggable transceiving unit consist of the same front connector located on a front panel of the housing.

17. The system of claim 15, wherein the first and second connectors of the at least one standardized hot-pluggable transceiving unit consist of two different front connectors respectively located on a front panel of the housing.

18. The system of claim 15, further comprising at least one other standardized hot-pluggable transceiving unit inserted into the chassis, the at least one other transceiving unit comprising:

a housing having standardized dimensions and adapted to being inserted into the chassis;

a host interface on a back panel of the housing, the host interface being connected to the hosting unit;

a connector for receiving a source video stream;

at least one processing unit in the housing for:
executing a conversion function, the conversion function generating a video Internet Protocol (IP) flow based on the source video stream; and
executing a Hypertext Transfer Protocol (HTTP) client, the HTTP client establishing a connection with a HTTP server hosted by a cloud video server and transmitting the video IP flow to the HTTP server of the cloud video server via one of the following: the connector or another connector of the at least one other transceiving unit, the video IP flow using one of the HTTP or the Hypertext Transfer Protocol Secure (HTTPS) protocol.

19. A system comprising:

a hosting unit comprising a chassis adapted for receiving at least one standardized hot-pluggable transceiving unit, the chassis comprising at least one processing unit capable of processing packets of an Internet Protocol (IP) flow; and the at least one standardized hot-pluggable transceiving unit inserted into the chassis, the at least one standardized hot-pluggable transceiving unit each comprising:

a housing having standardized dimensions and adapted to being inserted into the chassis;

a host interface on a back panel of the housing, the host interface being connected to the hosting unit;

a connector for receiving a source video stream;

at least one processing unit in the housing for:
executing a conversion function, the conversion function generating a video Internet Protocol (IP) flow based on the source video stream; and
executing a Hypertext Transfer Protocol (HTTP) client, the HTTP client establishing a connection with a HTTP server hosted by a cloud video server and transmitting the video IP flow to the HTTP server of the cloud video server via one of the following: the connector or another connector of the transceiving unit, the video IP flow using one of the HTTP or the Hypertext Transfer Protocol Secure (HTTPS) protocol.

20. The system of claim 19, wherein the first and second connectors of the at least one standardized hot-pluggable transceiving unit are respectively different from the host interface.

21. The system of claim 20, wherein the first and second connectors of the at least one standardized hot-pluggable transceiving unit consist of the same front connector located on a front panel of the housing.

22. The system of claim 20, wherein the first and second connectors of the at least one standardized hot-pluggable transceiving unit consist of two different front connectors respectively located on a front panel of the housing.

23. The system of claim 19, wherein at least one of the first and second connectors the at least one standardized hot-pluggable transceiving unit is the host interface.

24. The system of claim 19, further comprising at least one other standardized hot-pluggable transceiving unit inserted into the chassis, the at least one other transceiving unit comprising:

a housing having standardized dimensions and adapted to being inserted into the chassis;

a host interface on a back panel of the housing, the host interface being connected to the hosting unit;

a first connector for receiving a source video IP flow;

at least one processing unit in the housing for:
executing a Hypertext Transfer Protocol (HTTP) client, the HTTP client establishing a connection with a HTTP server hosted by a cloud video server and receiving the source video IP flow from the HTTP server of the cloud video server via the first connector, the source video IP flow using one of the HTTP or the Hypertext Transfer Protocol Secure (HTTPS) protocol; and
executing a conversion function, the conversion function generating a video stream based on the source video IP flow; and a second connector for outputting the video stream.

* * * * *